(12) United States Patent
Millman et al.

(10) Patent No.: US 12,422,418 B2
(45) Date of Patent: Sep. 23, 2025

(54) ACTIVATABLE PRINT MEDIUM

(71) Applicant: Temptime Corporation, Morris Plains, NJ (US)

(72) Inventors: Michael S. Millman, Camas, WA (US); Mohannad Abdo, Clifton, NJ (US); Marielle K. Smith, Parlin, NJ (US); John Olson, Dayton, NJ (US); Eric W. Liberato, Pequannock, NJ (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 1122 days.

(21) Appl. No.: 17/361,620

(22) Filed: Jun. 29, 2021

(65) Prior Publication Data
US 2022/0412933 A1    Dec. 29, 2022

(51) Int. Cl.
*G01D 3/10*    (2006.01)
*G01K 3/04*    (2006.01)
(Continued)

(52) U.S. Cl.
CPC ............. *G01N 31/229* (2013.01); *G01D 3/10* (2013.01); *G01K 3/04* (2013.01); *G09F 3/0291* (2013.01)

(58) Field of Classification Search
CPC .......... G01N 31/229; G01D 3/10; G01K 3/04; G09F 3/0291
See application file for complete search history.

(56) References Cited

U.S. PATENT DOCUMENTS 3,967,579 A  *  7/1976  Seiter ................ G01K 11/08
                                                374/E11.007
4,912,485 A  *  3/1990  Minowa ................ B41J 2/36
                                                    347/186
(Continued)

FOREIGN PATENT DOCUMENTS

WO    WO 2017086883 A1    5/2017

OTHER PUBLICATIONS

PCT Search Report and Written Opinion dated Sep. 12, 2022 issued for International PCT Application No. PCT/US22/34651.
(Continued)

*Primary Examiner* — Jill A Warden
*Assistant Examiner* — Michael Stanley Gzybowski
(74) *Attorney, Agent, or Firm* — K&L Gates LLP

(57) ABSTRACT

An activatable print medium is disclosed. The print medium includes a first reactive component, a second reactive component, wherein the first and second reactive components are configured to react to initiate a state change of the activatable print medium when exposed to each other and a barrier that is initially in an unactivated form and configured to transition to an activated form when activated by an application of at least one of an activation heat and an activation pressure wherein after the barrier is activated, but not before, the activatable print medium is configured so that the first and second reactive components interact in response to a predetermined environmental stimulus or interact over time at a rate dependent on an environmental stimulus, thereby providing an indication of the cumulative historical exposure of the activatable print medium to the environmental stimulus.

43 Claims, 21 Drawing Sheets

(51) Int. Cl.
 *G01N 31/22* (2006.01)
 *G09F 3/00* (2006.01)

(56) References Cited

U.S. PATENT DOCUMENTS

| | | |
|---|---|---|
| 6,544,925 B1 | 4/2003 | Prusik et al. |
| 7,290,925 B1 | 11/2007 | Skjervold et al. |
| 8,343,437 B2 | 1/2013 | Patel |
| 9,448,182 B2 | 9/2016 | Haarer et al. |
| 2012/0083043 A1* | 4/2012 | Grande Telleria ....... G01K 3/04 |
| | | 436/164 |
| 2014/0044609 A1* | 2/2014 | Prusik .................. G01N 31/229 |
| | | 422/429 |
| 2016/0096105 A1 | 4/2016 | Cove |
| 2016/0349224 A1* | 12/2016 | Patel ........................ G07C 1/00 |
| 2019/0346415 A1 | 11/2019 | Abdo et al. |

OTHER PUBLICATIONS

Extended European Search Report dated Apr. 11, 2025 issued for European Patent Application No. 22833945.3.

* cited by examiner

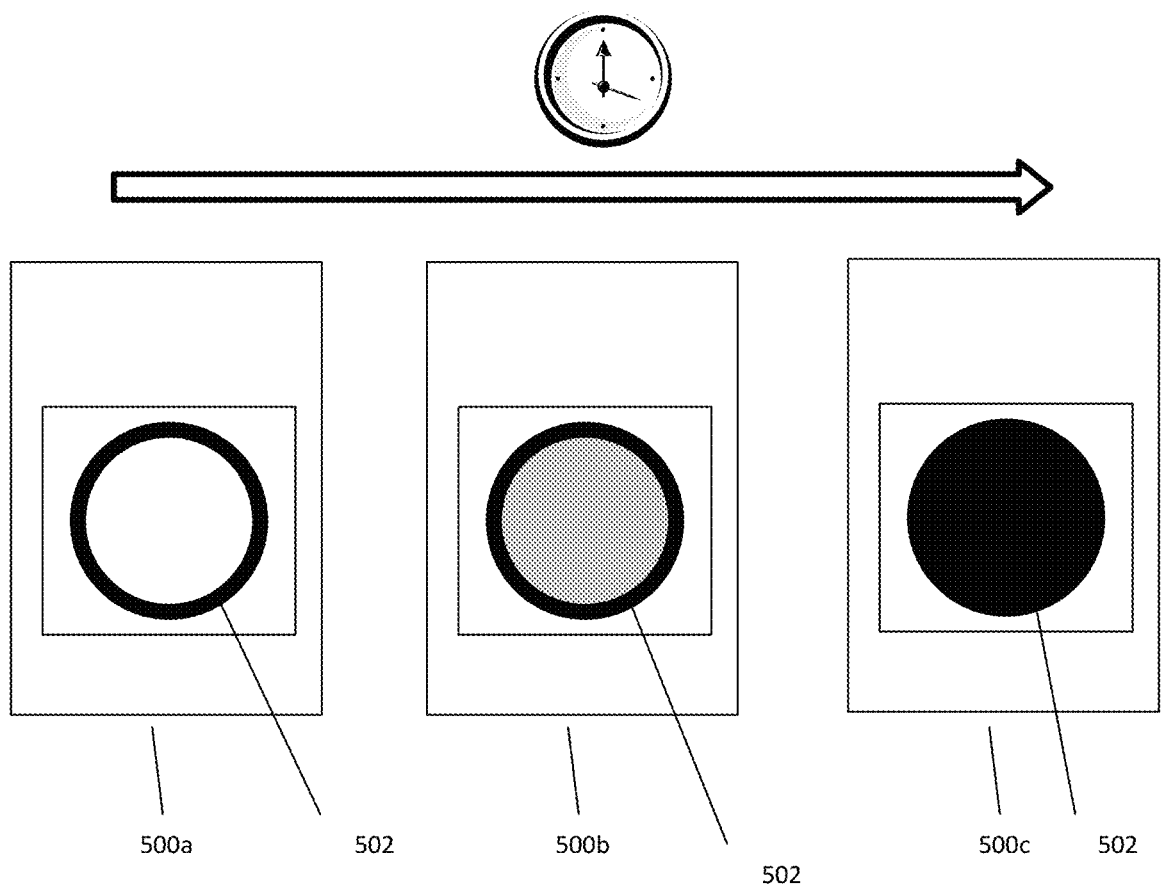

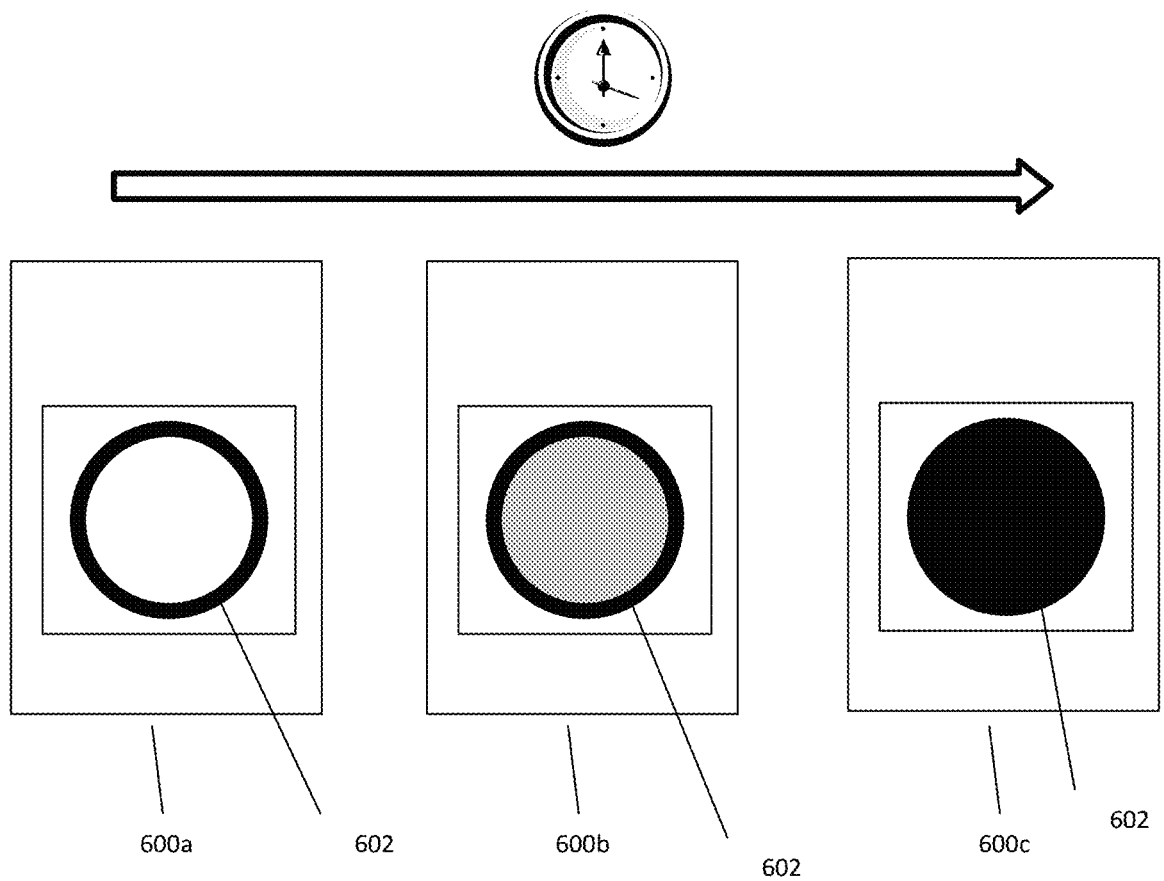

ACTIVATABLE PRINT MEDIUM

BACKGROUND

Perishable products including pharmaceuticals, food products, biologics, which may become unfit or unsafe for use after a certain length of time, or after exposure to various environmental conditions such as high temperature, radiation, UV or light exposure, oxygen exposure, freezing, thawing, or simply the passage of time, or the combination of multiple conditions, such as cumulative excess heat exposure over time. It is desirable to include environmental exposure indicators on such perishable products, or on or in their containers or packaging, in order to detect when products are either unfit for use, or approaching the end of their useful life.

Common cumulative time-temperature indicators use diacetylenes, which change color at a rate that depends upon temperature. Other approaches for monitoring excess temperature exposure, such as U.S. Pat. No. 8,343,437 to Patel and U.S. Pat. No. 9,448,182 to Haarer include indicators that depend on metal etching or the diffusion of ions that cause such etching through a medium, processes whose reaction rates can be tuned to indicate cumulative excess temperature exposure over time based on the temperature dependent kinetics of the etching and/or diffusion processes.

Many indicators are irreversible, or at least have strong hysteresis effects, so that they provide a reliable view of historical exposure to environmental conditions. Particularly for sensitive indicators, or indicator materials intended to have a long shelf life, it is desirable that the indicators remain inactive until they are incorporated in a printed label, and/or actually paired with a product that is entering the supply chain or moving into a different phase of the supply chain. Accordingly, indicators which require an active process to "activate" the indicator and cause it to begin to operate are desirable for many applications. Prior "activatable" environmental indicators have included, e.g., two chemical components, whose reaction controls the indicator process, which are in provided separately and then are brought into contact using physical connection. Examples include reactants in separate reservoirs in a clamshell structure that is folded together to bring the reactants into potential contact with other, and to react after a predetermined environmental exposure occurs. Another example is providing reactants in two films that are affixed to each other, e.g., with an adhesive, when the indicator is activated, such as the indicators described in U.S. Pat. No. 6,544,925 to Prusik et al. Other examples include indicators with a removable film barrier that can be withdrawn, e.g., by manually pulling it out, from between the two chemical components.

Thermal printers, which use high temperature print heads to change the color of special printable media, are ubiquitous in the supply chains of many industries. The present disclosure describes activatable indicators that are optimized for use in the existing thermal printing ecosystem.

SUMMARY

Disclosed herein are activatable print media for providing an indication of the historical exposure of the activatable print media to an environmental stimulus after an activation event. The indicated exposure may either be peak environmental stimulus exposure beyond a threshold, such as freeze or thaw indication or temperature exposure above a critical temperature, exposure to an environmental stimulus above a threshold for a particular period of time, or cumulative exposure to an environmental stimulus over time, such as cumulative time-temperature exposure over a threshold. The activatable print media may also provide an indication of the duration of time that has elapsed since the activatable print media has been exposed to an activation event.

Aspects of the subject matter described herein may be useful alone or in combination with one or more other aspects described herein. In an aspect of the present disclosure, an activatable medium includes a first a first reactive component, a second reactive component, a barrier initially in an unactivated form and configured to transition to an activated form when activated by an application of at least one of an activation heat and an activation pressure.

In another aspect of the present disclosure, which may be used in combination with any other aspect or combination of aspects listed herein, the first and second reactive components are configured to react to initiate a state change of the activatable print medium when exposed to each other.

Aspects of the subject matter described herein may be useful alone or in combination with one or more other aspects described herein. In an aspect of the present disclosure, a direct thermal label includes a thermal paper substrate configured to be printed by a direct thermal print process with a heated thermal print head. The thermal paper substrate has a print temperature and is adapted to change color when heated by the heated thermal print head to or above the print temperature. The activatable print medium includes the temperature exposure indicator material, which is configured to change color state in response to a temperature exposure above a predetermined threshold temperature, which is below the print temperature. Additionally, the direct thermal label includes a dataform imaged on the thermal paper substrate at or above the print temperature without the temperature exposure indicator material changing color state.

In another aspect of the present disclosure, which may be used in combination with any other aspect or combination of aspects listed herein, an activatable print medium includes a first reactive component a second reactive component, the first and second reactive components configured to react to initiate a state change of the activatable print medium when exposed to each other; and a barrier initially in an unactivated form and configured to transition to an activated form when activated by an application of at least one of an activation heat and an activation pressure.

In another aspect of the present disclosure, which may be used in combination with any other aspect or combination of aspects listed herein, in the unactivated form, the barrier is configured to separate the first reactive component and the second reactive component, preventing their interaction.

In another aspect of the present disclosure, which may be used in combination with any other aspect or combination of aspects listed herein, in the activated form, the barrier is configured to allow the first reactive component to interact with the second reactive component.

In another aspect of the present disclosure, which may be used in combination with any other aspect or combination of aspects listed herein, after the barrier is activated, but not before, the activatable print medium is configured so that it has at least one of the following properties: the first and second reactive components are configured to interact in response to a predetermined environmental stimulus, thereby providing an indication of the historical exposure of the activatable print medium to the environmental stimulus, the first and second reactive components are configured to interact over time at a rate dependent on an environmental stimulus, thereby providing an indication of the cumulative historical exposure of the activatable print medium to the environmental stimulus, and the first and second reactive components are configured to react so that the state change of the active indicator occurs after a predetermined time has elapsed after the activation of the barrier layer, thereby indicating the active indicator has been activated for at least the predetermined time interval.

In another aspect of the present disclosure, which may be used in combination with any other aspect or combination of aspects listed herein, the property is (a) or (b), and wherein the activation heat is above a temperature of 100° C., and wherein the predetermined environmental stimulus is a temperature exposure in a range from about from about 0° C. to about 50° C.

In another aspect of the present disclosure, which may be used in combination with any other aspect or combination of aspects listed herein, the first and second reactive components are configured to react to initiate a continuous state change of the activatable print medium.

In another aspect of the present disclosure, which may be used in combination with any other aspect or combination of aspects listed herein, the property is (a) or (b), wherein the environmental stimulus is one of time, temperature, time-temperature product, cumulative time-temperature, heat, cumulative heat exposure, moisture, humidity, oxygen exposure, light exposure, ionizing radiation, and UV radiation.

In another aspect of the present disclosure, which may be used in combination with any other aspect or combination of aspects listed herein, the state change is an optical property change of the activatable print medium, wherein the optical property is one of reflectance, transparency, saturation, color, apparent color, color density, optical density, or a color hue.

In another aspect of the present disclosure, which may be used in combination with any other aspect or combination of aspects listed herein, the state change is a change in apparent color visible to a naked human eye.

In another aspect of the present disclosure, which may be used in combination with any other aspect or combination of aspects listed herein, the state change is a change in an electrical property of the activatable print medium.

In another aspect of the present disclosure, which may be used in combination with any other aspect or combination of aspects listed herein, the property is (c).

In another aspect of the present disclosure, which may be used in combination with any other aspect or combination of aspects listed herein, the activatable print medium includes a base media substrate, wherein the first and second reactive components are supported by the base media substrate.

In another aspect of the present disclosure, which may be used in combination with any other aspect or combination of aspects listed herein, the base media substrate further comprises at least one of (i) a metallic layer, (ii) aluminum, (ii) an absorbent substrate, (iii) a paper substrate, (iv) a cellulose paper, and (v) a polymer film substrate.

In another aspect of the present disclosure, which may be used in combination with any other aspect or combination of aspects listed herein, the activatable print medium includes a protective component overlaying the first reactive component, wherein the protective component is configured to protect the first reactive component from an activation device.

In another aspect of the present disclosure, which may be used in combination with any other aspect or combination of aspects listed herein, the activation device is a thermal print head.

In another aspect of the present disclosure, which may be used in combination with any other aspect or combination of aspects listed herein, the barrier comprises a meltable wax.

In another aspect of the present disclosure, which may be used in combination with any other aspect or combination of aspects listed herein, the melting point of the barrier is in a range from about from about 50° C. to about 300° C., from about 100° C. to about 300° C., from about 150° C. to about 300° C., from about 200° C. to about 300° C., from about 250° C. to about 300° C.

In another aspect of the present disclosure, which may be used in combination with any other aspect or combination of aspects listed herein, the first reactive component is an etchant, the barrier further comprises a meltable solid which resists the etchant, and the second reactive component is an etchable coating protected from the etchant by the barrier when the barrier is in the unactivated state.

In another aspect of the present disclosure, which may be used in combination with any other aspect or combination of aspects listed herein, the meltable solid is one of a wax, a fatty acid amide, an ester, or an Ethylene Vinyl Acetate ("EVA") copolymer resin.

In another aspect of the present disclosure, which may be used in combination with any other aspect or combination of aspects listed herein, the etchable coating is a metallic coating.

In another aspect of the present disclosure, which may be used in combination with any other aspect or combination of aspects listed herein, the application of the at least one of heat and pressure causes the meltable solid to melt and at least one of (i) flow away, (ii) sublimate or (iii) become porous, thereby bringing the first reactive component and the second reactive component into contact with each other.

In another aspect of the present disclosure, which may be used in combination with any other aspect or combination of aspects listed herein, the state change is a color change, and wherein the color change occurs gradually over time.

In another aspect of the present disclosure, which may be used in combination with any other aspect or combination of aspects listed herein, the first reactive component is thiocyanate, the barrier is one of a meltable solid and a polymer gel, and the second reactive component is a ferric ion ($Fe3+$).

In another aspect of the present disclosure, which may be used in combination with any other aspect or combination of aspects listed herein, the polymer gel has a molecular weight in a range from about 1 g/mol to 100,000 g/mol, from about 3,500 g/mol to 6,000 g/mol and from about 200 g/mol to 2,000 g/mol.

In another aspect of the present disclosure, which may be used in combination with any other aspect or combination of aspects listed herein, the polymer gel has a melting point of a temperature above approximately 100° C.

In another aspect of the present disclosure, which may be used in combination with any other aspect or combination of aspects listed herein, the second reactive component is applied to a porous base media substrate having micro-channels, and wherein the second reactive component occupies the micro-channels of the base media substrate.

In another aspect of the present disclosure, which may be used in combination with any other aspect or combination of aspects listed herein, the first reactive component is at least one of (i) incorporated into the barrier and (ii) applied as an over-layer or over-coating on the barrier.

In another aspect of the present disclosure, which may be used in combination with any other aspect or combination of aspects listed herein, the state change is a color change, and wherein the color change occurs gradually over time.

In another aspect of the present disclosure, which may be used in combination with any other aspect or combination of aspects listed herein, the first reactive component is a base, the barrier is a polymer with a high glass transition temperature, and the second reactive component is an acid.

In another aspect of the present disclosure, which may be used in combination with any other aspect or combination of aspects listed herein, the polymer is Polysulfone and the glass transition temperature is at least approximately 190° C.

In another aspect of the present disclosure, which may be used in combination with any other aspect or combination of aspects listed herein, the barrier is adapted to transition from the unactivated form to the activated form responsive to an application of heat from a thermal print head, and wherein the application of heat causes the barrier to undergo a phase change from a non-permeable state to a permeable state.

In another aspect of the present disclosure, which may be used in combination with any other aspect or combination of aspects listed herein, the first reactive component is a meltable material formulated as one of a dispersion or an emulsion having a particle size, the barrier is a porous material with a pore size smaller than the particle size, and the second reactive component is an absorbent substrate impregnated with a reactive dye.

In another aspect of the present disclosure, which may be used in combination with any other aspect or combination of aspects listed herein, the meltable material is Polystyrene, the porous material is one of carbon fiber, Teslin synthetic paper, polyethylene ("PE"), polypropylene ("PP"), and polytetrafluoroethylene ("PTFE"), and the absorbent substrate is paper.

In another aspect of the present disclosure, which may be used in combination with any other aspect or combination of aspects listed herein, the reactive dye is configured to change color in response to an interaction with the first reactive component.

In another aspect of the present disclosure, which may be used in combination with any other aspect or combination of aspects listed herein, the first reactive component is formulated as one of a dispersion and an emulsion having a particle size smaller than a pore size of the absorbent substrate.

In another aspect of the present disclosure, which may be used in combination with any other aspect or combination of aspects listed herein, in response to an application heat from a thermal print head, the first reactive component is configured to pass through the barrier thereby being absorbed into the absorbent substrate.

In another aspect of the present disclosure, which may be used in combination with any other aspect or combination of aspects listed herein, the first reactive component is a first material containing a first reactant, the barrier is a porous material, and the second reactive component is a second material containing a second reactant.

In another aspect of the present disclosure, which may be used in combination with any other aspect or combination of aspects listed herein, the porous material is one of polyethylene ("PE") and polypropylene ("PP"), and wherein the porous material is infused with a meltable material.

In another aspect of the present disclosure, which may be used in combination with any other aspect or combination of aspects listed herein, the barrier is adapted to transition from the unactivated form to the activated form responsive to an application heat from a thermal print head, and wherein the application of heat causes the barrier to undergo a phase change from a non-permeable state to a permeable state.

In another aspect of the present disclosure, which may be used in combination with any other aspect or combination of aspects listed herein, the state change is a color change, and wherein the color change occurs gradually over time.

In another aspect of the present disclosure, which may be used in combination with any other aspect or combination of aspects listed herein, the first reactive component is a first material containing a basic reactant, the barrier is a porous material with an embedded sublimating material, and the second reactive component is a second material containing an acidic reactant.

In another aspect of the present disclosure, which may be used in combination with any other aspect or combination of aspects listed herein, at least one of the first or the second reactive component is applied to a base media substrate.

In another aspect of the present disclosure, which may be used in combination with any other aspect or combination of aspects listed herein, the sublimating material is configured to transition from a solid state to a gaseous state above a sublimation temperature.

In another aspect of the present disclosure, which may be used in combination with any other aspect or combination of aspects listed herein, the sublimating material is one of Naphthalene, Menthol, Cyclododecane, Benzoic acid, Anthracene, and a perfluorinated alkane.

In another aspect of the present disclosure, which may be used in combination with any other aspect or combination of aspects listed herein, the barrier is adapted to transition from the unactivated form to the activated form responsive to an application of heat from a thermal print head, and wherein the application of heat causes the embedded sublimating material to sublimate thereby allowing the first reactive component to interact with the second reactive component.

In another aspect of the present disclosure, which may be used in combination with any other aspect or combination of aspects listed herein, the state change is a color change, and wherein the color change occurs gradually over time.

In another aspect of the present disclosure, which may be used in combination with any other aspect or combination of aspects listed herein, the activatable print medium includes a substrate a first reactive component in a first layer supported by the substrate a second reactive component in a second layer, the second reactive component configured to react with the first reactive component to initiate a state change, a barrier between the first and second layers, and configured to transition from an unactivated form to an activated form in response to at least one of an activation heat and an activation pressure.

In another aspect of the present disclosure, which may be used in combination with any other aspect or combination of aspects listed herein, when the activatable print medium is in the unactivated form, the barrier is configured to separate the first reactive component and the second reactive component and prevent their reaction, and in the activated form, the barrier is configured to allow the first reactive component to react with the second reactive component.

In another aspect of the present disclosure, which may be used in combination with any other aspect or combination of aspects listed herein, the activatable print medium includes a substrate a first reactive component supported by the substrate, a second reactive component, the second reactive component configured to react with the first reactive component to initiate a state change, a barrier between the first and second layers, configured to transition from an unactivated form to an activated form in response to at least one of an activation heat and an activation pressure.

In another aspect of the present disclosure, which may be used in combination with any other aspect or combination of aspects listed herein, when the activatable print medium is in the unactivated form, in the unactivated form, the barrier is configured to separate the first reactive component and the second reactive component and prevent their reaction, and in the activated form, the barrier is configured to allow at least one of the first reactant and the second reactant to diffuse bringing the first and second reactant into contact over time, the rate of diffusion controlling the rate of apparent state change and thereby indicating either elapsed time or cumulative time-temperature exposure of the activatable print medium.

In another aspect of the present disclosure, which may be used in combination with any other aspect or combination of aspects listed herein, a method for activating an activatable indicator with a media processing device having a thermal print head includes receiving an activatable print medium, the activatable print medium includes a first reactive component, a second reactive component, the first and second reactive components configured to react to initiate a state change of the activatable print medium when exposed to each other, and a barrier initially in an unactivated form and configured to transition to an activated form when activated by an application of at least one of an activation heat and an activation pressure wherein in the unactivated form, the barrier is configured to separate the first reactive component and the second reactive component, preventing their interaction, in the activated form, the barrier is configured to allow the first reactive component to interact with the second reactive component.

In another aspect of the present disclosure, which may be used in combination with any other aspect or combination of aspects listed herein, after the barrier is activated, but not before, the activatable print medium is configured so that it has at least one property selected from the group consisting of: the first and second reactive components are configured to interact and initiate the state change in response to a predetermined environmental stimulus, thereby providing an indication of the historical exposure of the activatable print medium to the environmental stimulus, the first and second reactive components are configured to interact over time and to initiate the state change at a rate dependent on a predetermined environmental stimulus, thereby providing an indication of the cumulative historical exposure of the activatable print medium to the environmental stimulus, and the first and second reactive components are configured to react so that the state change of the active indicator occurs after a predetermined time interval has elapsed after the activation of the barrier, thereby indicating the active indicator has been activated for at least the predetermined time interval, applying at least one of heat and pressure to the activatable print medium using the thermal print head of the media processing device, thereby transitioning the barrier from the unactivated form to the activated form and thereby allowing the first reactive component to interact with the second reactive component.

In another aspect of the present disclosure, which may be used in combination with any other aspect or combination of aspects listed herein, the applying at least one of heat and pressure includes applying heat above a temperature of 100° C., and wherein the environmental stimulus is a temperature exposure in a range from about from about 0° C. to about 50° C.

In another aspect of the present disclosure, which may be used in combination with any other aspect or combination of aspects listed herein, the method of activating an activatable indicator includes initiating a continuous state change of the activatable print medium by causing the first and second components to react.

In another aspect of the present disclosure, which may be used in combination with any other aspect or combination of aspects listed herein, the method of activating an activatable indicator includes monitoring the state change of the activatable print medium.

In another aspect of the present disclosure, which may be used in combination with any other aspect or combination of aspects listed herein, the environmental stimulus is one of time, temperature, time-temperature product, cumulative time-temperature, heat, cumulative heat exposure, moisture, humidity, oxygen exposure, light exposure, ionizing radiation, and UV radiation.

In another aspect of the present disclosure, which may be used in combination with any other aspect or combination of aspects listed herein, the state change is an optical property change of the activatable print medium selected from the group consisting of reflectance, transparency, saturation, color, apparent color, color density, optical density, or a color hue.

In another aspect of the present disclosure, which may be used in combination with any other aspect or combination of aspects listed herein, the state change is a change in apparent color visible to a naked human eye.

In another aspect of the present disclosure, which may be used in combination with any other aspect or combination of aspects listed herein, the method of activating an activatable indicator includes initiating a time delayed state change with the first reactant of the activatable print medium.

In another aspect of the present disclosure, which may be used in combination with any other aspect or combination of aspects listed herein, the activatable print medium further includes a protective component overlaying the first reactive component, wherein the protective component protects the first reactive component from the thermal print head.

In another aspect of the present disclosure, which may be used in combination with any other aspect or combination of aspects listed herein.

In another aspect of the present disclosure, which may be used in combination with any other aspect or combination of aspects listed herein, the method of activating an activatable indicator includes melting the barrier by heating it to a temperature in a range from about 50° C. to about 300° C., from about 100° C. to about 300° C., from about 150° C. to about 300° C., from about 200° C. to about 300° C., from about 250° C. to about 300° C.

In another aspect of the present disclosure, which may be used in combination with any other aspect or combination of aspects listed herein, the method of activating an activatable indicator includes applying wherein at least one of heat and pressure to the barrier causing the barrier to transition states and allowing at least a portion of the first reactive component to interact with the second reactive component.

In another aspect of the present disclosure, which may be used in combination with any other aspect or combination of aspects listed herein, a device includes a processor, a memory coupled to the processor and a thermal print head.

In another aspect of the present disclosure, which may be used in combination with any other aspect or combination of aspects listed herein, the processor configured to receive a layout for an indicator, use the thermal print head to apply at least one of heat and pressure to an activatable print medium positioned within the device according to the received layout, the activatable print medium including a first reactive component, a second reactive component, the first and second reactive components configured to react to initiate a state change of the activatable print medium when exposed to each other, and a barrier initially in an unactivated form and configured to transition to an activated form when activated by an application of at least one of an activation heat and an activation pressure, wherein in the unactivated form, the barrier is configured to separate the first reactive component and the second reactive component, in the activated form, the barrier is configured to allow the first reactive component to interact with the second reactive component, and the first and second reactive components are configured to interact (a) over a period of time, (b) in response to an environmental stimulus, or (c) over time at a rate dependent on an environmental stimulus, thereby providing an indication of the historical exposure of the activatable print medium to the environmental stimulus.

In another aspect of the present disclosure, which may be used in combination with any other aspect or combination of aspects listed herein, the print head is configured to apply heat at a thermal transfer temperature that is in the range selected from the group consisting of about 150 to 300° C., about 175 to 275° C., about 200 to 250° C., about 210 to 250° C., about 220 to 250° C., about 230 to 250° C., about 240 to 250° C., about 210 to 240° C., about 210 to 230° C., and about 210 to 220° C.

In another aspect of the present disclosure, which may be used in combination with any other aspect or combination of aspects listed herein, the device is a printer.

These and other features are disclosed in greater detail in the accompanying figures and the Detailed Description below.

BRIEF DESCRIPTION OF THE FIGURES

Some example apparatus embodiments of the invention, and example procedures for making and using one or more example embodiments, are described in detail herein and by way of example, with reference to the accompanying drawings (which are not necessarily drawn to scale with regard to any internal or external structures shown) and in which like reference characters designate like elements throughout the several views, and in which:

FIG. 5D illustrates a perspective view of the activatable print medium of FIG. 4A, in the initial state, mid-reaction and in the end state according to an example of the present disclosure.

FIG. 6D illustrates a perspective view of the activatable print medium of FIG. 4A, in the initial state, mid-reaction and in the end state according to an example of the present disclosure.

DETAILED DESCRIPTION OF EXAMPLE EMBODIMENTS

Figure 1A:
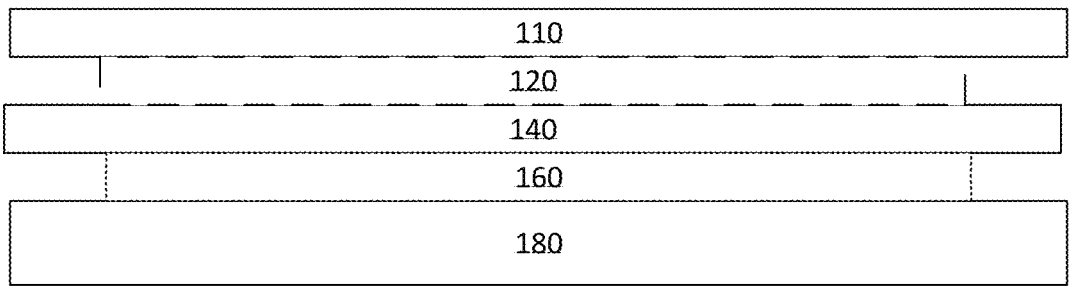
FIG. 1A illustrates a perspective view of the layers an activatable print medium indicator, according to an example of the present disclosure.

The present disclosure describes activatable environmental indicators that may be activated by heat and/or pressure, e.g., using a thermal print head of a conventional or modified thermal printer. These indicators may be provided in modified versions of thermal print media stock, so that, in some cases, the same thermal printer may be used both to print on the media and to activate, or selectively activate the environmental indicators. The activatable environmental indicators are particularly suitable for cumulative time temperature exposure indicators, but may also be used for other types of activatable environmental exposure indicators, and particularly exposure indicators, such as radiation, oxygen, light, UV, humidity, or simply the passage of time.

Additionally, techniques for printing activatable environmental exposure indicators, such as temperature exposure indicators, with a thermal printer stock are disclosed. Prior applications involving thermal printing have not addressed using an activatable environmental indicator material. While such prior indicators may be configured to be thermally printed, the indicators are provided on the thermal print stock, but are not activated by the thermal printer—they instead are active approximately from the instant the indicator materials are provided on the print stock. Either the thermal printer is configured to avoid printing on the indicator material, or the indicator material is insulated or otherwise configured so it is not materially affected by the thermal printing process. Also, in those prior approaches, existing thermal printing processes often print static information that is not intended to be sensitive to environmental factors such as temperature, time, time-temperature product, freezing, nuclear radiation, toxic chemicals, or the like.

A need exist for an activatable medium that is easily employed by an end-user and provides efficient on-demand label activation and printing of labels containing environmental exposure indicators of various types.

The present disclosure describes environmental exposure indicator (including indicators that simply show the passage of time) which may be provided as part of a printable medium, such as printable webs, paper, or other print stocks. The indicators may be provided initially in an inactive state, so they tend not respond to the environmental stimulus of interest. This may be accomplished, e.g., by having an indicator which indicates exposure to the environmental stimulus by the reaction of two or more components that are physically separated prior to activation by a barrier. The indicators may then be activated by heat and or pressure, e.g., the heat and pressure used by a conventional thermal print head may be used to remove the barrier between the two or more reactants. In this manner, the environmentally sensitive indicators may be provided as part of a special print stock that may be printed and activated during the printing process. Unlike conventional thermal print media involving reactants that change color during the thermal printing process, the reactants in the environmental indicator may react over an extended period of time. The rate of reaction, and therefore the time for a detectable indication to occur may depend on an environmental condition, e.g., the reaction rate may depend on temperature or other environmental condition, e.g., a cumulative time temperature exposure indicator. Alternatively, the reaction may be completely prevented prior to a predetermined environmental condition occurring, e.g., a freeze or thaw indicator.

The present disclosure includes an activatable print medium for providing an indication of the historical exposure of the activatable print medium to the environmental stimulus and/or providing an indication of duration of time elapsed since an activation event.

As used herein, the term "activation material" refers to a material or combination of materials working together that prevents the operation of an environmental exposure indicator until such material is activated, e.g., a barrier separating the reactants of the environmental exposure indicator or otherwise preventing their reaction, even in the presence of the predetermined environmental condition that would normally trigger a state transition for the environmental exposure indicator.

As used herein, the term "activation event" is a treatment, e.g., the exposure to certain amount of heat and/or pressure that causes the activation material to cease preventing the environmental exposure indicator from operating.

As used herein, the term "non-activated state" refers to a state of the "activation material" such that the "activation material" is inhibiting the operation of the environmental exposure indicator so that the indicator will not respond, or will respond only in a materially reduced manner, to the relevant environmental exposure(s). The "activated state" means the environmental exposure indicator will respond in its intended fashion to the relevant environmental exposure (s), e.g., depending on the type of environmental indicator, either immediately upon exposure beyond a threshold, or over time, or over time a rate dependent on amount of exposure.

As used herein, the term "activation device" is a device configured to selectively cause an activation material to transition from its inactivated state to its activated state.

As used herein, the term "print head" refers to a component of an activation device that transfers heat and/or pressure to an activatable print medium in response to an instruction from the activation device.

As used herein, exposure to an "environmental stimulus" is exposure to stimulus such as, temperature, time-temperature product, cumulative time-temperature, heat, cumulative heat exposure, moisture, humidity, oxygen exposure, light exposure, ionizing radiation, UV radiation, exposure to biological toxins, antigens, or other biological components, or exposure to particular chemicals.

As used herein, the term "reactive component" refers to a material that changes state in a detectable manner upon interaction with another reactive component in response to a predetermined environmental condition. In an example, the "reactive component" (or multiple reactive components interacting) is configured to undergo a continuous chemical or physical state change between an "initial state" and an "end state". The change of state may be a change in a property, e.g., an optical property, such as a reflectance value, saturation value, color value, color density value, optical density value or color hue value of the "reactive component" or an electrical property. Specifically, the state change (e.g., optical property change) may provide exposure information indicating an exposure to an environmental stimulus since the environmental exposure indicator was in the "activated state."

As used herein, the term "barrier" refers to a material or combination of materials working together to separate the reactive components of the environmental exposure indicator or otherwise preventing their reaction, even in the presence of the predetermined environmental condition that would normally trigger a state transition for the reactive components of the environmental exposure indicator. However, in response to an activation event, the material or combination of materials working together to separate the reactive components may be selectively altered to allow the reactive components to interact.

Activation—Generally

A conventional thermal printing technology for printing data forms or images, such as barcode symbols, is direct thermal printing. A direct thermal printer does not use a ribbon, but instead the printable media itself is the thermal media. The direct thermal media is manufactured or coated with a thermochromic material that changes color when exposed to sufficient heat, such as a leuco dye, which switches from a first chemical form that is colorless to a second chemical form that is black or colored. The web of direct thermal media is pressed against and moved past the thermal print head. The thermal print head receives data of a rendered bitmap and heats specific heating elements within the row of addressable heaters according to the data.

To print labels or other documents, thermal printers may use a thermal print head comprising a row of addressable heating elements to heat a thermal media. The elements are small compared to the image to be printed; e.g., 8, 12, or 24 elements per mm are typical, and other resolutions, are commercially available. This differs from thermal inkjet printers which use addressable heaters to heat an ink or wax that is dropped or ejected to a document or other printable media.

Heat from the heated elements causes the thermochromic material on the printable media to transition from colorless to black or from colorless to colored. Print head heating elements which are not heated do not cause a color transition. In some direct thermal media, a first zone of the printable media includes thermochromic material that transitions from colorless to a first color while a second zone of the printable media includes thermochromic material that transitions from colorless to a second different color. Some direct thermal media comprises a multi-layer arrangement including a first layer of a first color and a second non-transparent layer of a second color. For the multi-layer arrangements, heat from the heated print head elements cause the second layer to transition to a transparent state revealing the color of the first layer.

Figure 1B:
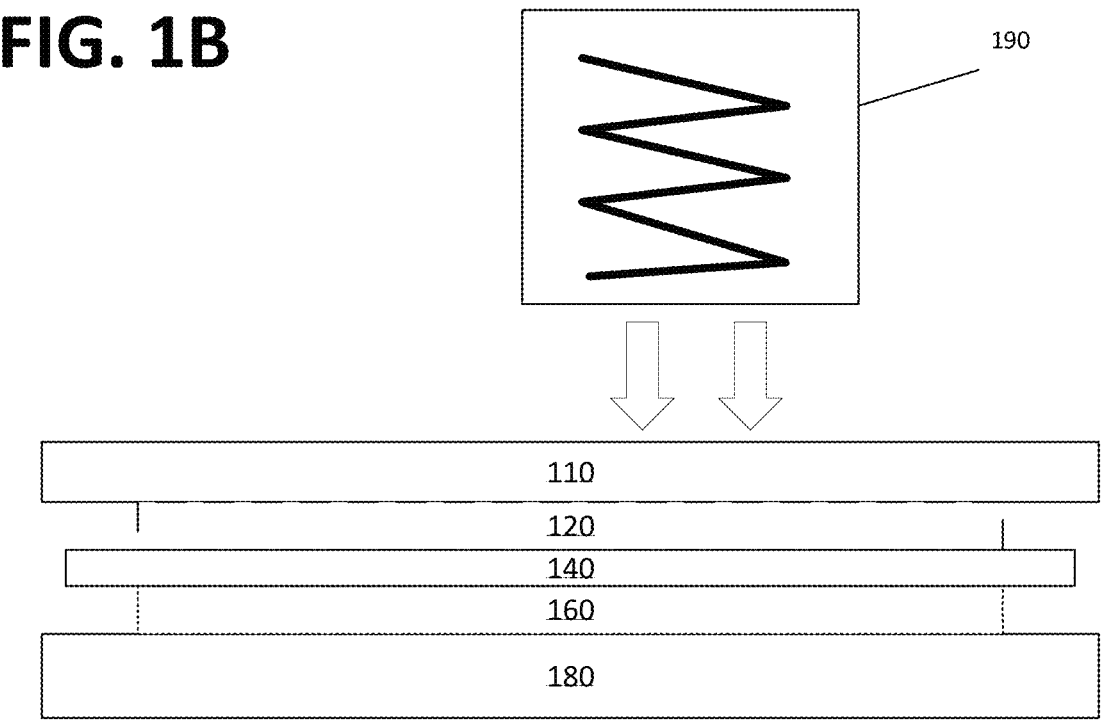
FIG. 1B illustrates a detailed view of an activatable print medium, during activation, according to an example the present disclosure.

FIGS. 1A and 1B illustrates a perspective view of the layers an activatable print medium 100. Optionally, the medium may contain conventional elements of a thermal print media, e.g., by adding components to a conventional thermal print media components, so that the print medium can still be printed using a conventional thermal printing process. Optionally, the medium may have a predetermined pattern, with conventional thermal print media structure in some predetermined locations, and with activatable environmental indicators in other locations. Alternatively, the conventional print media elements and environmental indicators may, in some cases overlap.

Conventional print media may be used as a backing to hold the environmental indicators as the indicators are processed by an activation device. The conventional print media backing may be placed either underneath the transparent upper layers or on the bottom most portion of the environmental indicator beneath the activatable portion. Additionally, certain layers of the environmental indicators may also include conventional printer media elements as a supportive substrate.

In additional to being printable with a conventional thermal printing process, the activatable print medium 100 may be activatable as a result of exposure to temperature or pressure changes, e.g., from heat and pressure applied using the conventional thermal print head. Components, e.g., layers of the activatable print media 100 may be configured such that the activatable print media 100 is sensitive to high temperature or temperature and pressure changes. As result of exposure to temperature or pressure changes, the configuration of the layers the activatable print media 100 may be altered. While layers are shown, it will be appreciated that approaches may be employed, e.g., using walls that prevent lateral movement of reactants that are broken by activation, or encapsulating reactants in a matrix or microspheres, and releasing them in response to heat and pressure of the thermal print head. The materials and thermal print head may be tuned, so that the activation takes place at the same, lower, or higher temperature than the conventional thermal printing process. As a result of the configuration of the layers of the activatable print media 100 being altered, the activatable print media 100 is activated, and may then operate as an environmental exposure indicator, which is configured to provide an indication of the historical exposure of the activatable print media 100 to the environmental stimulus that occurs after activation. In indicators where thermal print regions and activatable indicator overlap, it may be advantageous to have materials with significantly different response characteristics, so that the conventional printing and activatable media can each be triggered without activating the other, e.g., one may require a higher temperature to be triggered, while the other responds to a lower temperature but requires a longer exposure time. Alternatively, the materials may be place in different areas of the printable medium.

The activatable print medium 100 may include a clear overlaminate film 110, a first reactive component 120, a barrier 140, a second reactive component 160 and a base media substrate 180.

The clear overlaminate film 110 is a protective component overlaying the first reactive component 120. The overlaminate film 110 may be one of Fasson Faslam clear polypropylene, Avery Dennison® DOL series vinyl (PVC), any conformable overlaminate films, Apco PET or BOPP overlaminate films.

Depending on the desired application, overlaminate layer may optionally be UV, blocking, water resistant, hermetically sealed, chemically resistant, or merely a barrier to physical abrasion.

The base material 180 may be a printable substrate, e.g., a web material, e.g., paper such as a cellulose paper, polymer film substrate, a metallic layer, such as a metallic aluminum layer or an absorbent substrate. In some examples, the base material 180 may have a thickness in a range of about 1 mm to about 20 mm, from about 1 mm to about 10 mm or from about 10 mm to about 20 mm. The base material 180 may be one of a Polyolefin, polyamide, polypropylene, polyester Polyimide, Polyart synthetic paper or PPG Teslin paper. In an example, base material 180 may have a topcoat applied to the base material 180. Optionally, the base material 180 may further include a release liner or an adhesive backing to allow the activatable print medium 100 to be selectively attached to surfaces, e.g., as a label. Depending the application, the indicator may be provided as a continuous web of material that may be cut, or that may be perforated for easy separation into individual indicators, or as precut label stock in a desired form factor.

The base media substrate 180 may support the first 120 and second reactive components 160. These two reactive components may be separated by a barrier. In the example the barrier 140 is formed as a barrier layer between the first reactive component layer 120 containing a first reactive component and the second reactive component layer 160 containing a second reactive component. Barriers may also be configure in other manners, e.g., as barriers that separate areas of a single layer rather than running between layers, as a matrix trapping particles of one of the reactive components, or as microspheres containing one of the reactive components.

FIG. 1B illustrates the barrier 140 is initially in an unactivated form and configured to transition to an activated form when activated through exposure to an activating event 190, e.g., the heat and/or heat and pressure of a thermal print head. The activating event 190 may be the application of at least one of an activation heat and an activation pressure. In the unactivated form, the barrier 140 maintains separation between the first reactive component layer 120 and the second reactive component layer 160, and their respective reactants. In some examples, the barrier may be selectively removed, e.g., by melting or subliming, by activation. In other examples, the barrier may be altered into an activated state, e.g, by the melting or subliming of a blocking component or select section of the barrier, which leaves a porous scaffolding in place allowing subsequent interaction between the reactive components, e.g., over time without immediately placing the layers and their reactants in direct physical contact.

Once they are allowed to interact, the first and second reactive components are configured to react in order to initiate a state change that results in a change in an optical property or an electrical property of the activatable print medium 100 when the reactants are exposed to each other. The reaction of the first and second reactive components is only possible after the barrier 140 undergoes a state change which activates the activatable print medium 100. While the carriers and reactants found in the layers may depend on the particular type of reaction and application, example materials may include at least one of (i) a metallic layer, such as a metallic aluminum layer and an etchant (ii) an acid and a base that may interact, thereby causing a change in PH in a color changing PH indicator, and (iii) color-forming chemicals that interact to change color over time, such ferric cations and thiocyanate anions. The active layers may contain additional active chemical elements, such as dye precursors, etchants, or other inputs to a planned reaction that depends on time and/or environmental exposure. When the first and second reactive components come into contact, they may react in a predictable manner, either (a) immediately, (b) only after a particular environmental stimulus occurs, (c) over time, or (d) over time at a rate dependent on environmental stimulus. The beginning of the reaction may require an initial exposure to an environmental condition to initiate it. For example, a humidity exposure indicator may require exposure to sufficient humidity to provide sufficient water absorbed from the air to trigger a reaction. A thaw indicator may require an element in one of the reactive components to melt from exposure to a temperature over a threshold for a sufficient period of time to cause melting of the reactive component or the breaking of a gel component into a liquid. Alternatively, the rate of reaction may depend on the degree of exposure to an environmental condition, e.g., the kinetics of the chemical reaction between the components may depend on temperature. In such case, the rate of reaction may provide a record of historical exposure to heat or temperature over time. In another alternative, reactive components may need to migrate or diffuse in order to come into contact with each other after the barrier formed by the activation component is removed or altered, a process that may take some time and depend on temperature or other environmental exposure. In all the above examples, it may be preferable to have a reaction occur that is irreversible, or at least subject to a strong hysteresis, so that the indicator continues to show evidence of prior exposure to an environmental condition even after the environmental exposure of interest has cease.

The activatable print medium 100 may be activated through exposure to an activation event 190. The activation event 190 may be an application of at least one of an activation heat and an activation pressure. In some examples, the temperature threshold for activation may be from about 0° C. to 300° C., from about 100° C. to 300° C., and from about 200° C. to 300° C. Activation may be achieved by applying a high temperature for a very short interval. E.g., a few milliseconds. In this manner, even if the temperature needed to activate the device exceeds the temperature that a temperature exposure indicator is configured to indicate, the exposure may be so short that the indicator itself is not affected. For example, the mass or heat of fusion of the indicator may be much greater than the mass or heat of fusion of a barrier that needs to be removed, allowing a short exposure to high temperature to remove or alter the barrier without significantly affecting the indicator material itself. Typical thermal print heads have temperatures in the range from about 100° C. to 300° C., which may be tuned downward for select applications to from about 100° C. to 200° C. They are typically exposed to the thermal print heads for a brief period of time, for example a few milliseconds. The activation layer itself responds when it reaches a temperature of in a range from about 0° C. to 150° C., from about 0° C. to 50° C., from about 50° C. to 100° C., from about 100° C. to 150° C. In some cases, pressure may also contribute to the activation, e.g., by breaking components, such as microspheres or other barrier materials, either alone like an impact printer, or in combination with elevated temperature. The activation event 190 may be carried out using an activation device. In some examples, the activation device may be a device that includes a processor, a memory coupled to the processor and a thermal print head, e.g., a conventional thermal printer with software modifications, described elsewhere in the present disclosure.

Figure 1C:
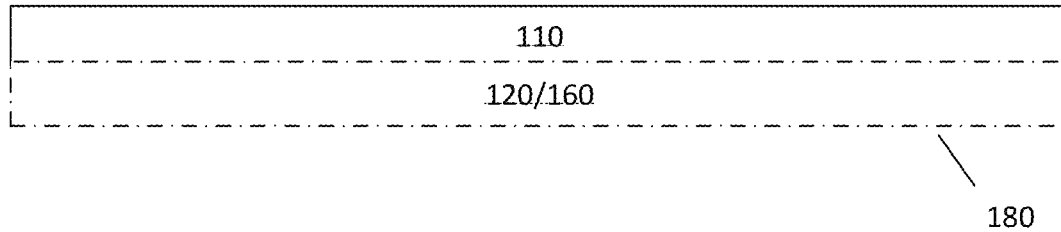
FIG. 1C illustrates a detailed view of an activatable print medium, post activation, according to an example of the present disclosure.

Referring to FIG. 1C, after the activatable print medium 100 has been exposed to an activation event 190, the barrier 140 transitions to the activated form where the barrier 140 is configured to allow the first reactive component 120 to interact with the second reactive component 160. (In some examples, this may even result in complete or near-complete removal of the barrier 140.)

Barrier

It will be appreciated that a variety of barrier materials may be chosen, depending on the application, the type of activation, and the nature of the reactants. In general the reactant must resist the passage, whether by flow, diffusion, or migration of the first and second reactants prior to activation.

For example, the barrier 140 may be a wax or other acid resistant compound having a relatively high melting point e.g., fatty acid amide, an ester or Elvax EVA resin. For example, the melting point may be in a range of about 50° C. to about 300° C., from about 100° C. to about 300° C., from about 150° C. to about 300° C., from about 200° C. to about 300° C., from about 250° C. to about 300° C.

In another example, the barrier 140 may be polymer coating having a high glass transition temperature (Tg) e.g. Polysulfone. For example, the glass transition temperature may be in a range of about 50° C. to about 300° C., from about 100° C. to about 300° C., from about 150° C. to about 300° C., from about 200° C. to about 300° C., from about 250° C. to about 300° C. For example, polysulfone, with a Tg of about 190 C may be used. In additional examples, the barrier may be one of Styrene Maleic Anhydride (SMA), Polyphenylene Ether (PPE), Cellulose Acetate, Cellulose Diacetate, Polyarylate, Polyamide, Polycarbonate, polyether ether ketone, Polyether Sulfone, PET, PFA, polymethyl methacrylate (PMMA) or Polyimide. In another example, the barrier 140 is a low molecular weight polymer gel having a high melting point, e.g., fatty acid amide, an ester or Elvax EVA resin. For example, the melting point may be in a range of about 100° C. to about 300° C., from about 150° C. to about 300° C., from about 200° C. to about 300° C., from about 250° C. to about 300° C. Additionally, in some examples, the polymer gel has a molecular weight in a range from about 1 g/mol to 100,000 g/mol, from about 3,500 g/mol to 6,000 g/mol and from about 200 g/mol to 2,000 g/mol. The first reactive component may be (i) incorporated into the barrier 140 or (ii) applied as an over-layer or over-coating on the barrier 140.

Reactive Components

The first reactive component and second reactive components are configured to interact, alternatively, (a) over a period of time in a manner that is not overly sensitive to expected environmental exposure, (b) in response to or after a particular environmental stimulus, such as temperature deviations over a threshold, freezing, thawing, oxygen, humidity, or radiation exposure, or (c) over time at a rate dependent on an environmental stimulus, e.g., temperature to show cumulative temperature exposure over time. In most examples the reaction is irreversible, or at least subject to a strong hysteresis effect, so that the interaction of the first and second reactive components may provide an indication of the historical exposure of the activatable print medium 100 to the environmental stimulus. Specifically, the environmental stimulus may be one of time, temperature, time-temperature product, cumulative time-temperature, heat, cumulative heat exposure, moisture, humidity, oxygen exposure, light exposure, ionizing radiation, UV radiation, exposure to biological toxins, antigens, or other biological components, or exposure to particular chemicals. Specifically, the first reactive component 120 may be tunable to be temperature sensitive.

The first reactive component and second reactive component may react to initiate a continuous state change of the activatable print medium. The state change may, e.g., be one of (i) an optical property change of the activatable print medium where the optical property may be, e.g., one or more of reflectance, transparency, saturation, color, apparent color, color density, optical density, or a color hue and (ii) a change in an electrical property of the activatable print medium, The state change may be a time delayed state change or a continuous state change. If the state change is an optical property, it may be a change in apparent color visible to a naked human eye, or may alternatively be in a spectrum not visible to humans but configured for reading with an electronic optical device.

Five different example mechanisms are described in the examples of the present disclosure: (a) the first reactant destroys or removes the second reactive component, for example by etching it or otherwise causing it degrade so it is no longer visible, either over time or in response to, or at a rate determined by an environmental stimulus such as temperature, (b) the first and second reactants have a color forming reaction, e.g., they are dye pre-cursors or other reactants that form color, either normally, or in the presence of particular environmental stimuli, and (c) the first reactant physically stains, colors, fills, some other change in the appearance or other detectable property of the second reactant without an actual chemical reaction between the first reactant and the second reactant taking place, (d) the two reactants react to change an electrical property from their unreacted (initial) state, e.g., transitioning from a conductor to a non-conductor or vice-versa, increasing or decreasing conductivity, or capacitance; (e) the reactants interact to change electrical properties, without a chemical reaction between them, e.g., a conductive liquid or conductive particles from one reactant are physically brought together with the other reactant by flow, diffusion, or the like.

For reactant pairs of the first type, suitable etchants include nitric acid, hydrochloric acid, picric acid, ethanol, potassium hydroxide, copper sulfate, sodium thiosulfate, potassium metabisulfite, copper chlorite, copper chlorate, copper ammonium, ammonia, hydrogen peroxide, hydrofluoric acid, phosphoric acid, and mixtures thereof. Suitable etchants can include mixtures of 1-5% $HNO_3$, 65-75% $H_3PO_4$, 5-10% $CH_3COOH$, using $H_2O$ dilution to define the etch rate at given temperature; mixtures of nitric acid, hydrochloric acid, and hydrofluoric acid; and mixtures of distilled water, nitric acid, and hydrofluoric acid. Other etchants include Keller's reagent and Kroll's reagent, ASTM No. 30, Adler etchant, carpenters stainless steel etch, Kalling's No. 2, Klemm's reagent, Nital, Marble's reagent, Murakami's, Picral, and Vilella's reagent, TECHNIETCH Al80. Etchants can also include the following: a mixture of $H_2O$ and HF; a mixture of HCl, $HNO_3$, and $H_2O$; diluted or concentrated HCl; a mixture of $H_3PO_4$, $HNO_3$, and HAc; a mixture of $H_3PO_4$, HAc, $HNO_3$, and $H_2O$; a mixture of $H_3PO_4$, $H_2O_2$, and $H_2O$; a mixture of $H_3PO_4$, $H_2O$, and glycerin; a mixture of $HClO_4$ and HAc; a mixture of $FeCl_3$ and $H_2O$; a 10% solution of $K_3Fe(CN)_6$; a mixture of KOH, $K_3Fe(CN)_6$, and $K_2B_4O_7 \cdot 4H_2O$; a mixture of $KMnO_4$, NaOH, and $H_2O$; a mixture of $NH_4OH$, $H_2O_2$, and $H_2O$; a 20% solution of $NH_4SO_4$; a dilute or concentrated solution of NaOH; an 8-10% solution of KOH; $CCl_4$; or a 10% solution of $Br_2$ and MeOH.

For reactant pairs of the second type, the reactant may be one of stains, inks, paints, pastes, dyes, pigments, powders, polymers, liquid crystal material, leuco dye material.

For reactant pairs of the third type, the reactant may be one of various acids and bases, for example, thymol blue, tropeolin OO, methyl yellow, methyl orange, bromphenol blue, bromcresol green, methyl red, bromthymol blue, phenol red, neutral red, phenolphthalein, thymolphthalein, alizarin yellow, tropeolin O, nitramine, and trinitrobenzoic acid, Thiocyanate, ferric ions ($Fe^{3+}$), potassium thiocyanate; thiocyanate ion, barium chloride; barium ions, potassium ferrocyanide; ferrocyanide ion with iron(III), tannic acid; tannic acid with iron(III), tartaric acid; tartaric acid with iron(III), sodium hydrogen sulfite; hydrogen sulfite ion with iron(III), $[Fe(H_2O)_6]$ 3+, $[Co(H_2O)_6]$ 2+, $[Ni(H_2O)_6]$ 2+, $[Cu(H_2O)_6]$ 2+, $[Zn(H_2O)_6]$ 2+, octahedral $[Co(H_2O)_6]$ 2+, tetrahedral $[CoCl_4]$ 2−, $[Ni(H_2O)_6]$ 2+, $[Ni(NH_3)_6]$ 2+, oil-soluble reducing agent, oxalic acid, phosphite ester, hydroxybenzoic acid ester, hydrohydroquinone, a hydroquinone derivative such as dimethyhydroquinone, di-tert-butyl hydro quinone, dialkylhydroquinone, 3-ethoxyphenol, 1,2-diethyl-3-hydroxybenzene, 1,3-diethyl-2-hydroxybenzene, 2,2'-methylenebis(3,4,6 trichlorophenol); meltable, or sensitizer-soluble, primary and secondary amines having low water solubility, for example, 4-butyl-aniline, phenol derivatives, organic acids, acid clays, reactive acid hectorite clay, phenolic resins, phenol-acetylene resins, polyvalent metallic salts of phenolic resins, zinc-including modified alkyl phenolic resin, zinc salicylate, zinc salicylate resin, 4,4'-isopropylidenebisphenol (also known as bisphenol A), 1,7-di(hydroxyphenylthio)-3,5-dioxaheptane, 4-hydroxyethyl benzoate, 4-hydroxydimethyl phthalate, monobenzyl phthalate, bi s-(4-hydroxy-2-methyl-5-ethylphenyl)sulfide, 4-hydroxy-4'-isopropoxydiphenylsulfone, 4-hydroxyphenylbenzenesulfonate, 4-hydroxybenzoyloxybenzylbenzoate, bis-(3-1-butyl-4-hydroxy-6-methylphenyl)sulfone, p-tert-butylphenol, or polymers based on bisphenol A. The color former may be chosen from a group including 3,3-bis(p-dimethylaminophenyl)-phthalide, 3,3-bis(p-dimethylaminophenyl)-6-dimethylaminophthalide (crystal violet lactone), 3,3-bis(p-dimethylaminophenyl)-6-diethylaminophthalide, 3,3-bis(p-dimethylaminophenyl)-6-chlorophthalide, 3,3-bis (p-dibutylaminophenyl)-phthalide, 3-(N—N-diethylamino)-5-methyl-7-(N,N-dibenzylamino) fluoran, 3-dimethylamino-5,7-dimethylfluoran, 3-diethylamino-7-methylfluoran, 3-(2'-hydroxy-4'-dimethylaminophenyl)-3-(2'[-methoxy-5'-chlorophenyl)phthalide, 3-(2'-hydroxy-4'-dimethylaminophenyl)-3-(2'-methoxy-5'-nitrophenyl-phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)-phthalide, benzoylleuco methylene blue, malachite green lactone, N-2,4,5-trichlorophenylleuco auramine, 3-diethylamino-6-methyl-7-chlorofluoran, 3,6-bis (diethylamino)fluoran-γ-(4'-nitro)-anilinolactam, 3-diethylamino-6-methyl-7-anilinofluoran, 3-(N-ethyl-N-isoamylamino)-6-methyl-7-anilinofluoran, 3-cyclohexylamino-6-chlorofluoran or 3-diethylamino-6,8-dimethylfluoran.

Additional examples of useful reactive components of the second type include oil-soluble reducing agents; oxalic acid; phosphite esters; hydroxybenzoic acid esters; hydrohydroquinone, hydroquinone derivatives such as dimethyhydroquinone, di-tert-butyl hydro quinone, other dialkylhydroquinones, and the like, 3-ethoxyphenol; 1,2-diethyl-3-hydroxybenzene; 1,3-diethyl-2-hydroxybenzene; 2,2'-methylenebis(3,4,6-trichlorophenol); meltable, or sensitizer-soluble, primary and secondary amines having low water solubility, for example, 4-butyl-aniline; phenol derivatives; organic acids; acid clays; FULACOLOR™ XIV reactive acid hectorite clay (available from Rockwood Additives, Widnes, UK); phenolic resins; phenol-acetylene resins; polyvalent metallic salts of phenolic resins; HRJ 2053 zinc-including modified alkyl phenolic resin (available from SI Group, Schenectady, NY); zinc salicylate, zinc salicylate resin; 4,4'-isopropylidenebisphenol (also known as bisphenol A); 1,7-di(hydroxyphenylthio)-3,5-dioxaheptane, 4-hydroxyethyl benzoate, 4-hydroxy dim ethyl phthalate; monobenzyl phthalate; bis-(4-hydroxy-2-methyl-5-ethylphenyl) sulfide, 4-hydroxy-4'-isopropoxydiphenylsulfone; 4-hydroxyphenylbenzenesulfonate; 4-hydroxybenzoyloxybenzylbenzoate; bis-(3-1-butyl-4-hydroxy-6-methylphenyl) sulfone; p-tert-butylphenol; and polymers based on bisphenol A.

For reactant pairs of the fourth type, the reactant may be one of Sodium hydroxide, Keller's reagent (mixture of acids—nitric, hydrochloric, hydrofluoric), phosphoric acid, phosphoric acid/zinc chloride, phosphoric acid/nitric acid, hydrochloric acid, nitric acid, ferric chloride, 2% nital (mixture of nitric acid, ethanol, methanol, or methylated spirits), cupric chloride, ferric chloride, ammonium persulfate, ammonia, 25-50% nitric acid, hydrochloric acid, hydrogen peroxide, silica or hydrofluoric acid.

For reactant pairs of the fifth type, the reactant may be one of SCC polymer emulsion/Silver conductive particles, Alkane wax/Nickel conductive particles, Alkane wax or SCC polymer/Graphene nanoparticles, Alkane wax or SCC polymer/Carbon black, Epoxy, silicone rubber, polyimide (PI), polypropylene (PP), low density PE (LDPE), HDPE, aluminum oxide, magnesium oxide, silicon oxide, zinc oxide, boron nitride (BN), Al nitride (AlN), silicon nitride and silicon carbide, graphite, iron, nickel, silicon, silver, tin or zinc.

Activatable Layer—Meltable Barrier Layer with Chemical Etching

Figure 2A:
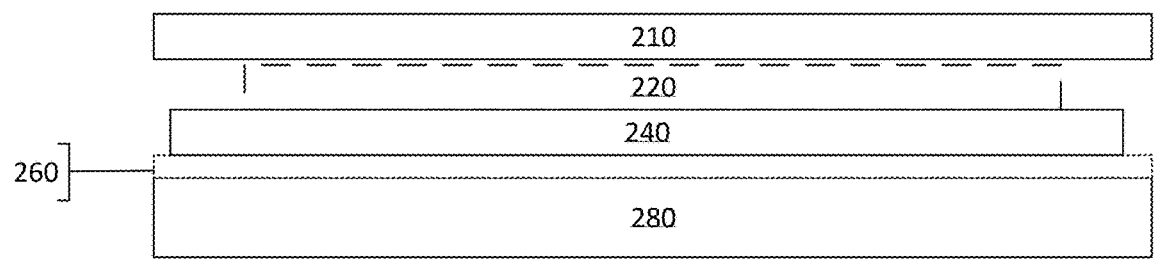
FIG. 2A illustrates a detailed view of an activatable print medium using metal etching, prior to activation, according to an example of the present disclosure.
Figure 2B:
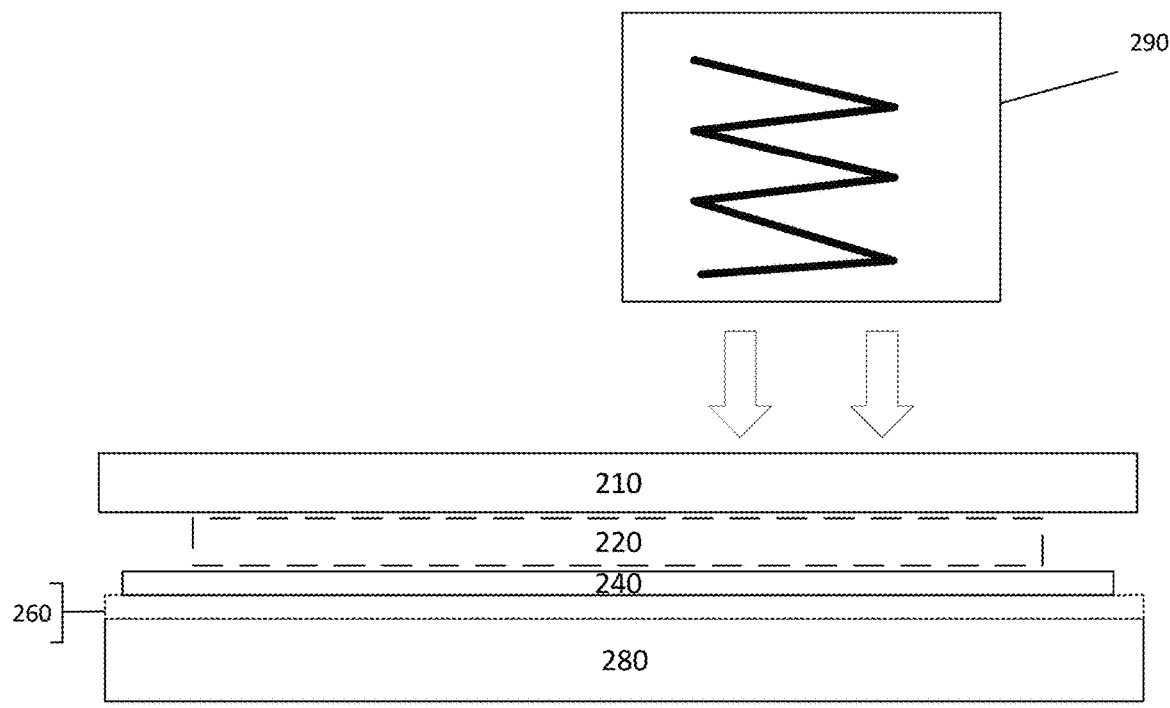
FIG. 2B illustrates a detailed view of the activatable print medium of FIG. 2A, during activation, according to an example the present disclosure.
Figure 2C:
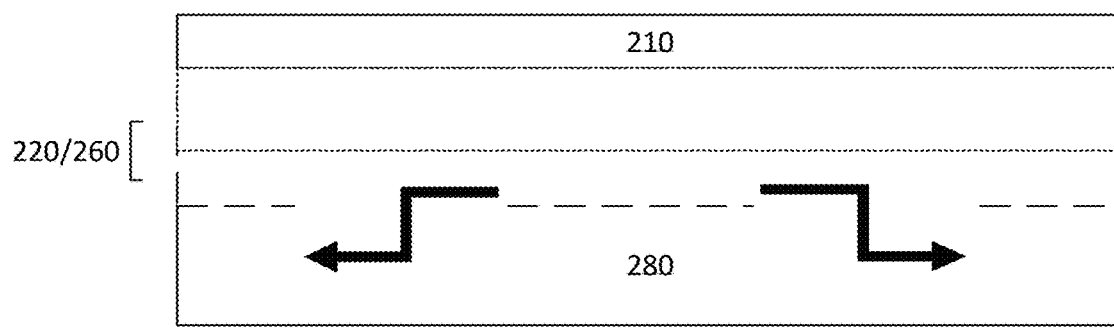
FIG. 2C illustrates a detailed view of the activatable print medium of FIG. 2A, post activation, according to an example of the present disclosure.

FIGS. 2A, 2B and 2C illustrate different embodiments of an activatable print medium 100. As illustrated in FIGS. 2A and 2B, an activatable print medium 200 includes a clear overlaminate film 210, a first reactive component 220, a barrier 240, a second reactive component 260 and a base media substrate 280. The first reactive component 220 is an active layer containing a reactive or etchant compound (e.g., acid). The barrier 240 may be a wax or other acid resistant compound having a relatively high melting point. The media substrate 280 base layer includes, the second reactive component 260, in the form of an etchable coating. The etchable coating may be, e.g., a metallic coating such as aluminum, but silver, copper, zinc, and other metals or metal allows may also be employed. In FIG. 2B, heat and or pressure may be applied in an activation event 290. This may cause the melting or sublimation of the barrier 240, so that the etchant and the metallic layer can interact.

Referring to FIG. 2C, after the activatable print medium 200 has been exposed to an activation event 290, the barrier 240 transitions to the activated form where the barrier 240 is configured to allow the first reactive component 220 to interact with the second reactive component 260. In some examples, this may even result in complete or near-complete removal of the barrier 140. In other cases portions of the barrier may remain, e.g., as a porous layer that allows diffusion of the etchant either towards the metallic layer, or along the plane of the activator as shown by the arrows in FIG. 2C. After activation, for example, the first reactive component 220, an etchant (e.g. an acid) etches away at the second reactive component 260, the etchable metallic coating of the media substrate 280 base layer. This etching may change the electrical or optical properties of the coating, producing a detectable state change in the activatable indicator. The acid may be one that is selected to react with the etchable metallic coating at a desired time- and/or temperature-dependent rate. Metallic aluminum and phosphoric acid are particularly suitable, although other metals and other etchants may also be employed. Any reactants capable of etching a metallic material may be used, such as the reactants described in sections [0081]-[0085] above.

A porous material may be provided adjacent the metal to be etched, or left as part of the barrier layer after part is removed. If the etchant is only present or activated in certain locations, the lateral migration of the etchant, e.g, by diffusion or wicking, over time over the surface may control the etching process. In this manner, different portions of the metallic layer may be etched over time, providing an indication of the passage of time, or if the etching is temperature sensitive, of cumulative exposure to excess heat over time. Once the barrier is removed, details of the etching process may be employed using the methods of U.S. Pat. No.

8,343,437 to Patel and U.S. Pat. No. 9,448,182 to Haarer or other environmental history indicators that rely on metal etching.

Activatable Layer—Coating

Figure 3A:
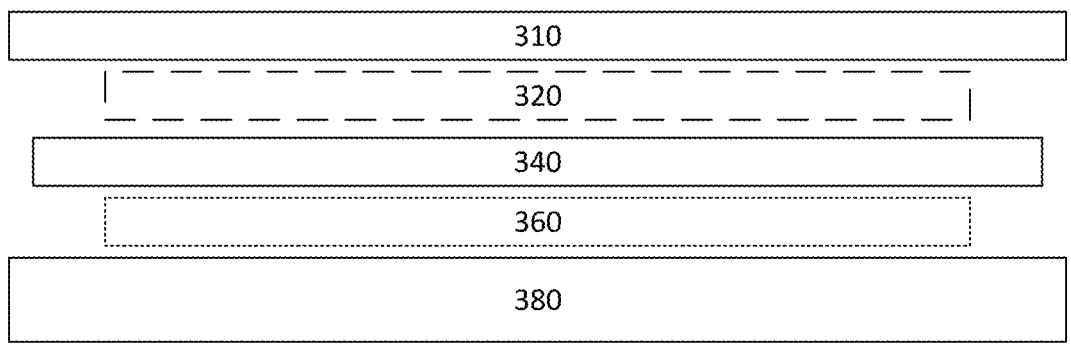
FIG. 3A illustrates a detailed view of an activatable print medium using an activatable barrier overcoat applied to one of the reactive layers, prior to activation, according to an example of the present disclosure.
Figure 3B:
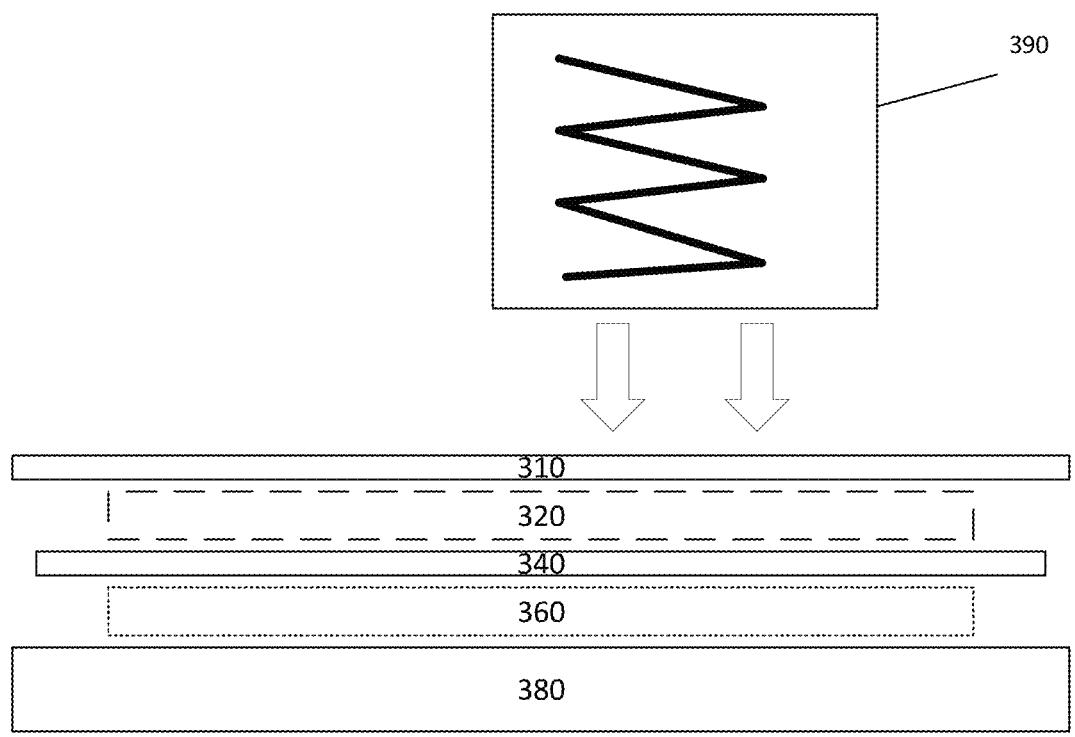
FIG. 3B illustrates a detailed view of the activatable print medium of FIG. 3A, during activation, according to an example the present disclosure.
Figure 3C:
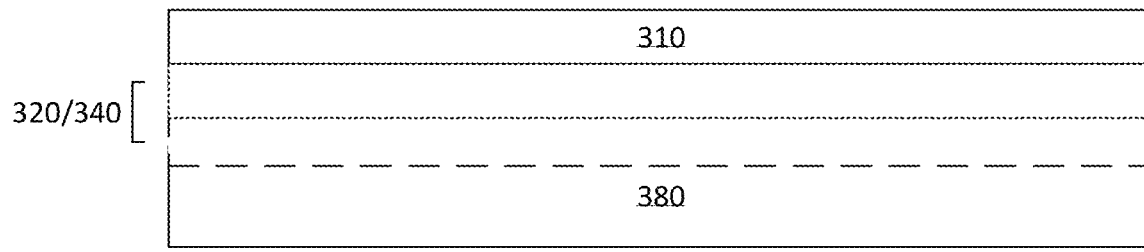
FIG. 3C illustrates a detailed view of the activatable print medium of FIG. 3A, post activation, according to an example of the present disclosure.

FIGS. 3A, 3B and 3C illustrate different embodiments of an activatable print medium 100. In this example the media base layer may have an active layer coated with reactive compound, a thin barrier layer may be provided as an overcoat, and a top-coat on the barrier layer may contain a second reactive component.

As illustrated in FIGS. 3A and 3B, an activatable print medium 300 includes a clear overlaminate film 310, a first reactive component 320, a barrier 340, a second reactive component 360 and a base media substrate 380. The first reactive component 320 is an active layer containing a reactive, compound (e.g., a base). For example, the base can be one of the above listed bases. The media substrate 380 base layer includes an active layer of the second reactive component 360 that coats the media substrate 380. For example, the second reactive component 360 is an acid, mixed with a color-forming PH indicator material. For example, the acid can be of the above listed acids. Prior to activation the polymer prevents interaction between the acid and base. The barrier 340 may be selected from one of the above mentioned materials. The polymer coating of the barrier 340 protects the acid layer of the media base from the basic reactive layer when the barrier is in the unactivated state. The polymer coating of the barrier 340 has a defined thickness, for example in the range of about 0.5 µm to about 3 µm, from about 0.5 µm to about 1 µm, from about 1 µm to about 2 µm from about 2 µm to about 3 µm. In an example, the thickness of the polymer coating of the barrier 340 may be tuned to modulate the reaction rate by controlling the interaction of the two reactive components 320 and 360.

Figure 4A:
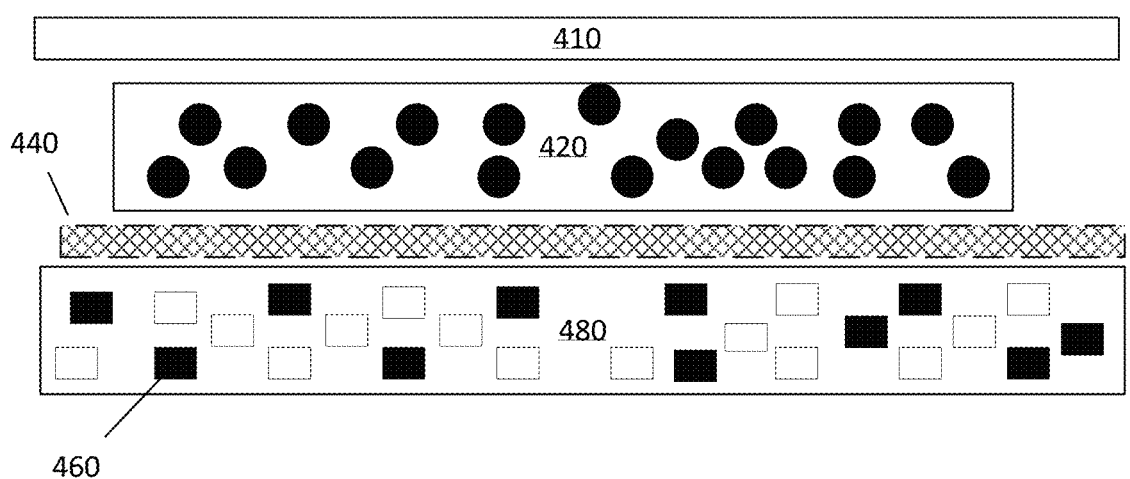
FIG. 4A illustrates a detailed view of an activatable print medium with an emulsion or dispersion that in the unactivated state cannot pass through a porous barrier, prior to activation, according to an example of the present disclosure.
Figure 4B:
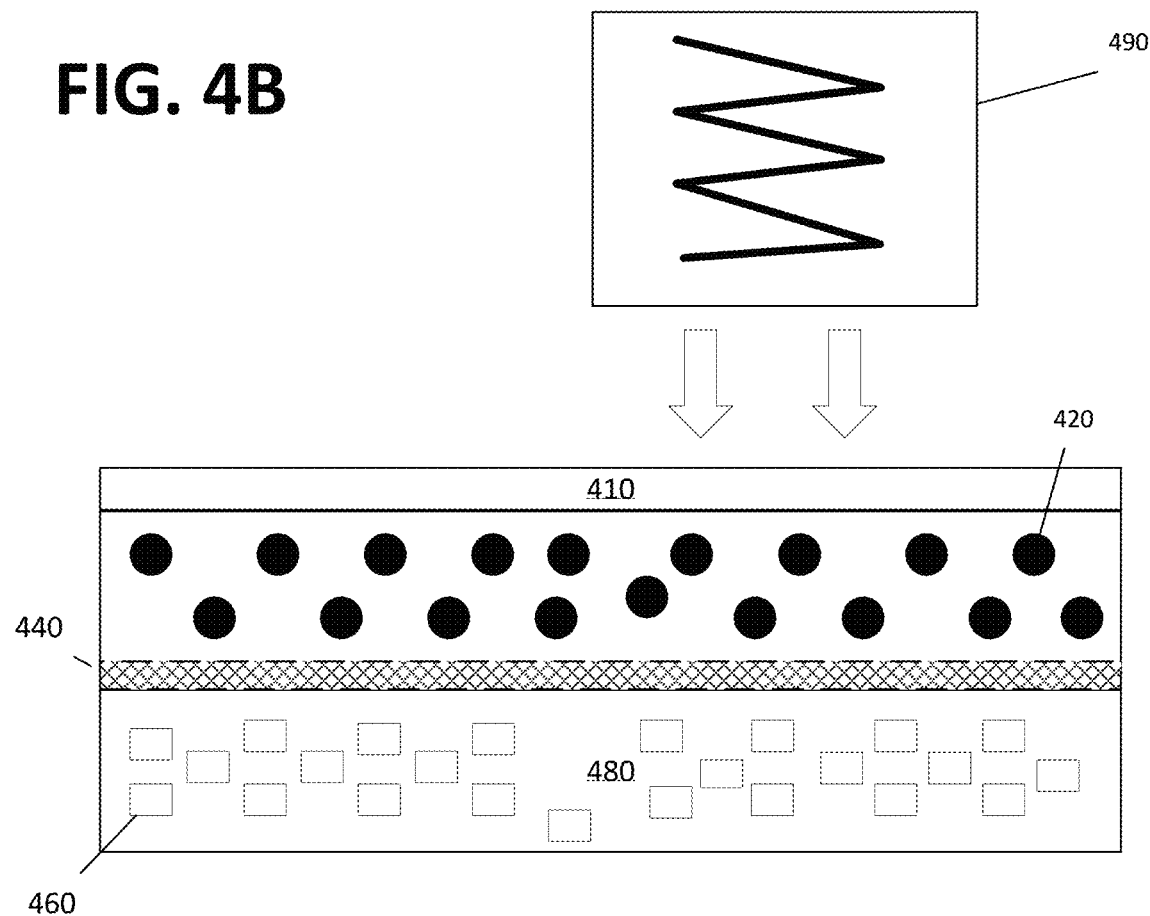
FIG. 4B illustrates a detailed view of the activatable print medium of FIG. 4A, during activation, according to an example the present disclosure.
Figure 4C:
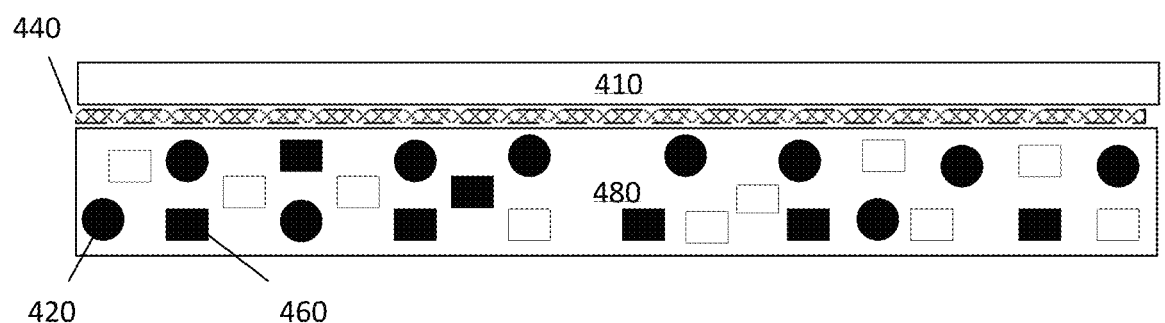
FIG. 4C illustrates a detailed view of the activatable print medium of FIG. 4A, post activation, according to an example of the present disclosure.

Referring to FIG. 3C, after the activatable print medium 300 has been exposed to an activation event 390, for example by heating it above its glass transition temperature. The first reactive component 320 to interact with the second reactive component 360, e.g., in a color forming reaction that occurs over a predetermined period of time. For example, the first reactive component 320, a base, reacts, with the second reactive component 360, an acid layer the media substrate 380 base layer causing a change in a color forming PH indicator. Although, it will be appreciated that other detectable reactions, e.g., other color-changing reactions that occur over time and/or which are sensitive to environmental exposure may be used. If the reactants are chosen so the reaction is not overly temperature sensitive, then this may allow the indicator to show the simple passage of time since activation. Alternatively, if the reaction rate depends on temperature, the reaction may provide a cumulative time temperature indicator. The reaction rate depends on other types of environmental conditions, other forms of environmental indicators may also be provided Activatable Layer—Emulsion FIGS. 4A, 4B and 4C illustrate different embodiments of an activatable print medium 100. As illustrated in FIGS. 4A and 4B, an activatable print medium 400 includes a clear overlaminate film 410, a first reactive component 420, a barrier 440, and a second reactive component 460. The first reactive component 420 is a high softening point meltable (e.g., Polystyrene) together with a first reactive material, formulated as a dispersion or an emulsion having a particle size. The first reactive component 420 preferably has a high softening point. For example, the softening point may be in a range of about 50° C. to about 300° C., from about 100° C. to about 300° C., from about 150° C. to about 300° C., from about 200° C. to about 300° C., from about 250° C. to about 300° C. The second reactive component 460 is an absorbent substrate impregnated with a reactive colored dye. The dye may change color in response to an interaction with the first reactive material from the first reactive component 420. For example, the second reactive component 460 can be paper, although other absorbent materials may be suitable. The barrier 440 is a porous material with a pore size slightly smaller than the particle size of the first reactive component 420. For example, the barrier 440 can be one of carbon fiber, Teslin synthetic paper, polyethylene ("PE"), polypropylene ("PP"), and polytetrafluoroethylene ("PTFE"). The pores of the barrier 440, prior to activation, are too small to the flow of particles through the barrier 440 in the z-axis.

Referring to FIG. 4C, after the activatable print medium 400 has been exposed to an activation event 490, the softening or melting or other phase change of at least some of the constituents of the reactive component allow the first reactive component 420 to pass through the barrier 440 and be absorbed into the absorbent substrate of the second reactive component 460. However, here the first reactive component 420 undergoes a phase change passes through the barrier 440 and is absorbed into the absorbent substrate of the second reactive component 460. The reactive dye of the absorbent material of the second reactive component 460 may change color, e.g., over time or in response to a particular environmental stimulus, in response to an interaction with the first reactive component 420.

It will be appreciated that other reactive compounds and materials may be used, where the first 420 and second reactive components 460 are configured to interact (a) over a period of time in a manner that is not overly sensitive to expected environmental exposure, (b) in response to a particular environmental stimulus, such as temperature deviations over a threshold, freezing, thawing, oxygen, humidity, or radiation exposure, or (c) over time at a rate dependent on an environmental stimulus, e.g., temperature. In most examples the reaction is irreversible, or at least subject to a strong hysteresis effect, so that the interaction of the first 420 and second reactive components 460 may provide an indication of the historical exposure of the activatable print medium 400 to the environmental stimulus. Specifically, the environmental stimulus may be one of time, temperature, time-temperature product, cumulative time-temperature, heat, cumulative heat exposure, moisture, humidity, oxygen exposure, light exposure, ionizing radiation, UV radiation, exposure to biological toxins, antigens, or other biological components, or exposure to particular chemicals. Specifically, the first reactive component 420 and the second reactive component 460 may be tunable to be temperature sensitive.

Figure 4D:
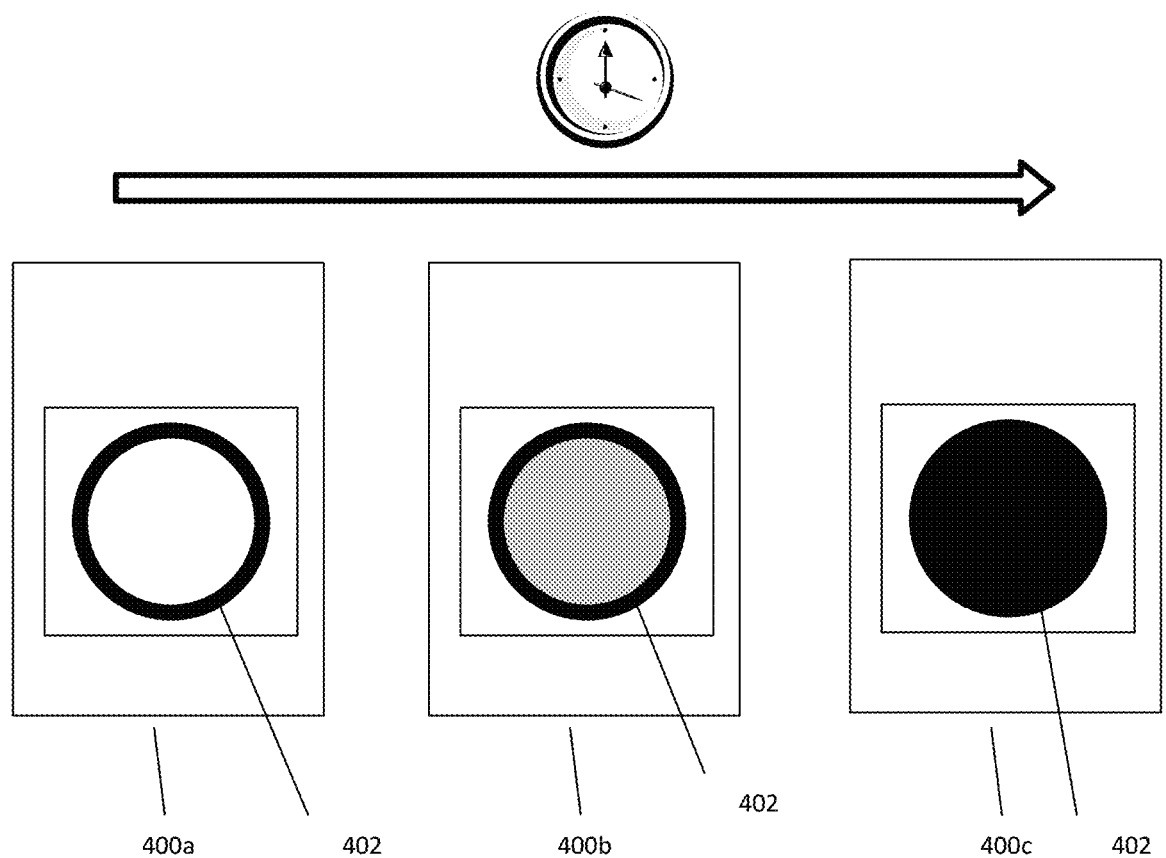
FIG. 4D illustrates a perspective view of the activatable print medium of FIG. 4A, in the initial state, mid-reaction and in the end state according to an example of the present disclosure.

For example, referring to FIG. 4D, an optical change occurs at a rate dependent on time. As time elapses, the first reactive component 420 and the second reactive component 460 react to cause an optical change. The activatable print medium 400a is in the initial state, immediately prior to activation, where the first reactive component 420 and the second reactive component 460 are restricted from interacting with each other. Upon activation and as time elapses, the activatable print medium 400b begins an optical change as the first reactive component 420 and the second reactive component 460 begin to react. Finally, after a period of time has elapsed, the reaction between the first reactive component 420 and the second reactive component 460 will reach the end state. When the reaction reaches the end state, the optical change has occurred to extent that matches the reference ring 402.

Activatable Layer—Meltable Infusion

Figure 5A:
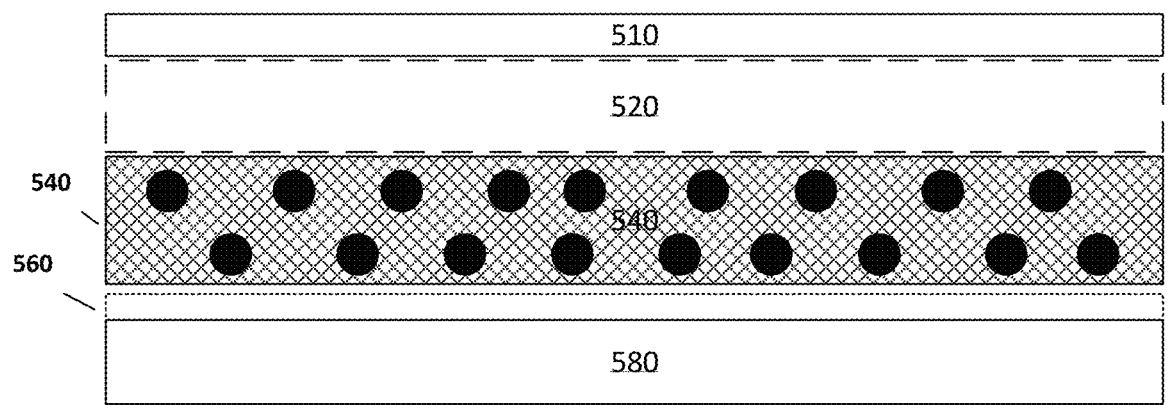
FIG. 5A illustrates a detailed view of an activatable print medium having a porous barrier infused with and blocked by a meltable material, prior to activation, according to an example of the present disclosure.
Figure 5B:
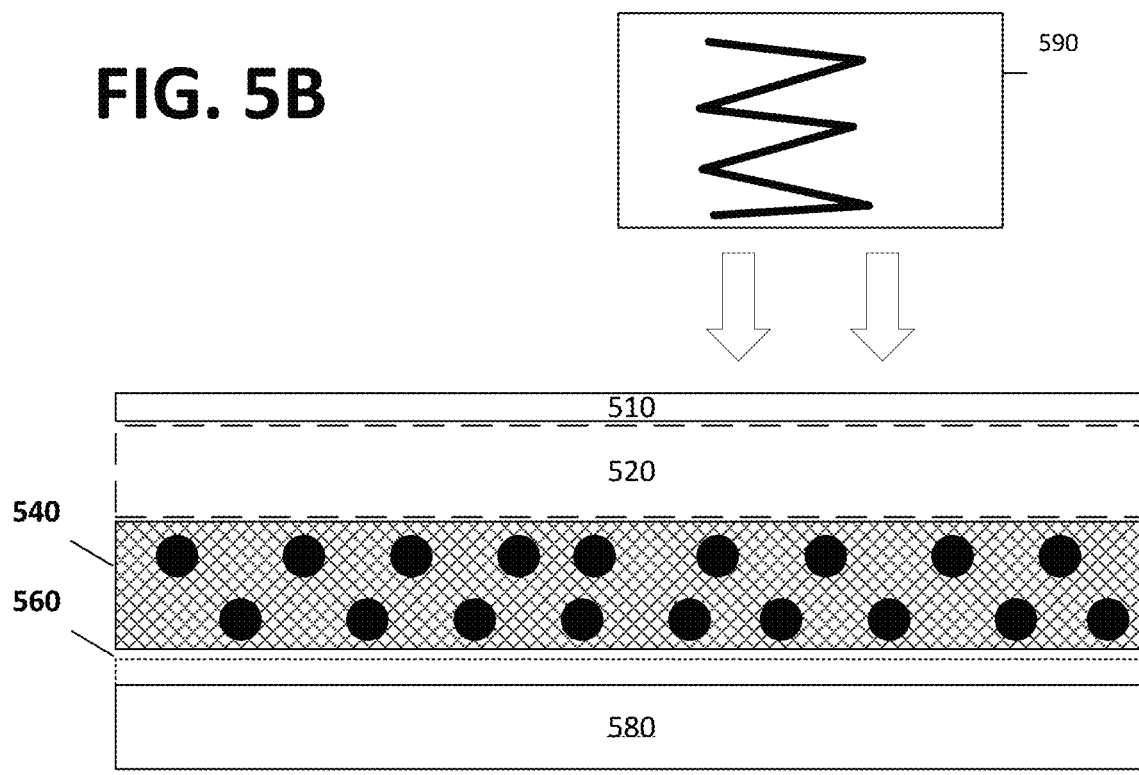
FIG. 5B illustrates a detailed view of the activatable print medium of FIG. 5A, during activation, according to an example the present disclosure.
Figure 5C:
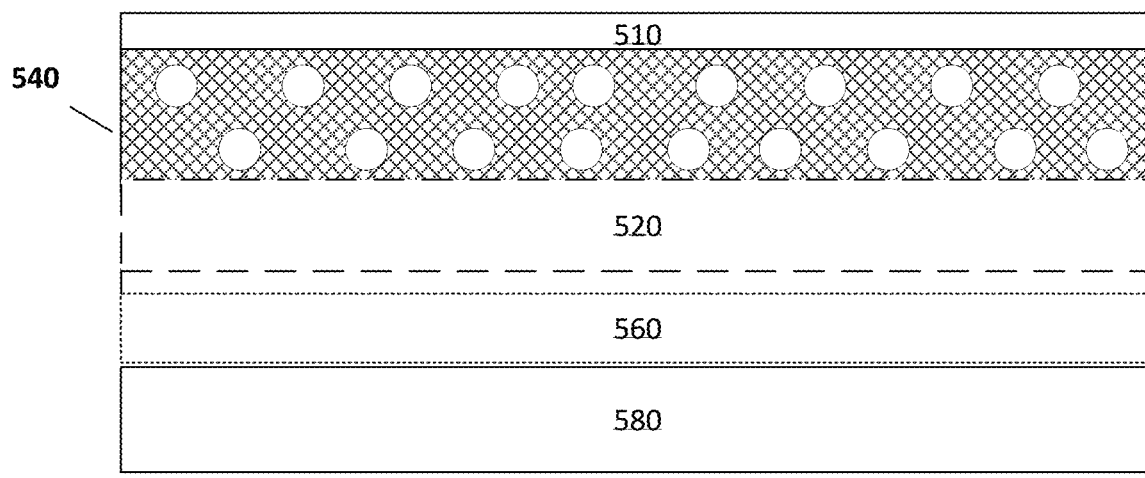
FIG. 5C illustrates a detailed view of the activatable print medium of FIG. 5A, post activation, according to an example of the present disclosure.

FIGS. 5A, 5B and 5C illustrate different embodiments of an activatable print medium 100. As illustrated in FIGS. 5A and 5B, an activatable print medium 500 includes a clear overlaminate film 510, a first reactive component 520, a barrier 540, a second reactive component 560 and a media base 580 substrate. The second reactive component 560 is coated with the second reactive component 560. The barrier 540 is a porous material. For example, the barrier 540 can be one of carbon fiber, Teslin synthetic paper, polyethylene ("PE"), polypropylene ("PP"), and polytetrafluoroethylene ("PTFE"). The pores of the barrier 540 allows for the flow of particulars through the barrier 540 in the z-axis. The barrier 540 is infused with a meltable material capable of undergoing a phase change. For example, the meltable material can be one of an alkane wax, a wax ester, a cross-linked hydrogel, or a polymer (e.g., 2,6-dimethyl-napthalene). The meltable material preferably has a high melting point, e.g., significantly greater than expected temperatures the indictor will be exposed to in normal usage. For example, the melting point may be in a range of about 50° C. to about 300° C., from about 100° C. to about 300° C., from about 150° C. to about 300° C., from about 200° C. to about 300° C., from about 250° C. to about 300° C.

Prior to activation, the infused material prevents the diffusion or flow of the reactants through the barrier, e.g., by filling the pores or channels in the porous barrier material. Referring to FIG. 5C, after the activatable print medium 500 has been exposed to an activation event 590, the meltable material infused within the barrier 540 undergoes a phase change. In some examples, exposure to an activation event, the application of the at least one of heat and pressure, causes the barrier 540 to undergo a phase change and at least one of (i) flow away, (ii) sublimate or (iii) become porous, allowing the first reactive component 520 to pass through the barrier 540 and come in contact with the second reactive component 560. The first reactive component 520 interacts with the second reactive component 560 and produces a reaction. For example, the second reactive component 560 may change color in response to an interaction with the first reactive component 520.

The first 520 and second reactive components 560 are configured to interact (a) over a period of time in a manner that is not overly sensitive to expected environmental exposure, (b) in response to a particular environmental stimulus, such as temperature deviations over a threshold, freezing, thawing, oxygen, humidity, or radiation exposure, or (c) over time at a rate dependent on an environmental stimulus, e.g., temperature. In most examples the reaction is irreversible, or at least subject to a strong hysteresis effect, so that the interaction of the first 520 and second reactive components 560 may provide an indication of the historical exposure of the activatable print medium 500 to the environmental stimulus. Specifically, the environmental stimulus may be one of time, temperature, time-temperature product, cumulative time-temperature, heat, cumulative heat exposure, moisture, humidity, oxygen exposure, light exposure, ionizing radiation, UV radiation, exposure to biological toxins, antigens, or other biological components, or exposure to particular chemicals. Specifically, the first reactive component 520 and the second reactive component 560 may be tunable to be temperature sensitive.

For example, referring to FIG. 5D, an optical change occurs at a rate dependent on temperature. As the temperature that the activatable print medium 500 is exposed to increase, the first reactive component 520 and the second reactive component 560 react to cause an optical change. The activatable print medium 500a is in the initial state, immediately prior to activation, where the first reactive component 520 and the second reactive component 560 are restricted from interacting with each other. Upon activation and as the exposure temperature increases, the activatable print medium 500b begins an optical change as the first reactive component 520 and the second reactive component 560 begin to react. Finally, after an exposure temperature threshold has been met, the reaction between the first reactive component 520 and the second reactive component 560 will reach the end state. When the reaction reaches the end state, the optical change has occurred to extent that matches the reference ring 502.

Activatable Layer—Sublimation

Figure 6A:
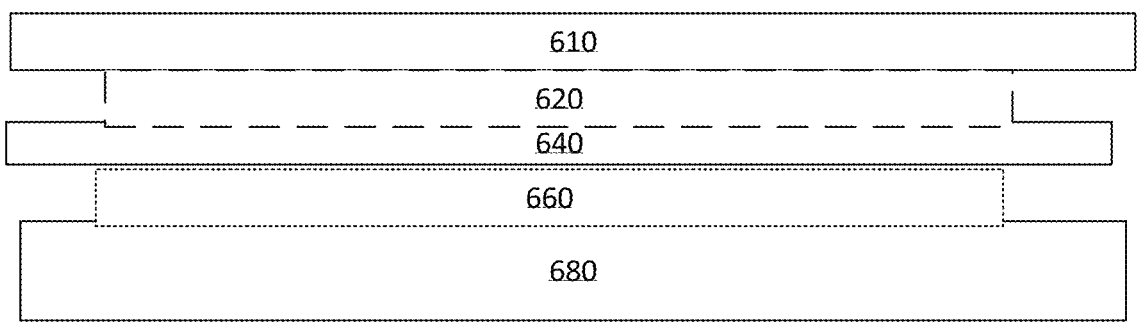
FIG. 6A illustrates a detailed view of an activatable print medium having a porous barrier blocked with a sublimating material prior to activation, according to an example of the present disclosure.
Figure 6B:
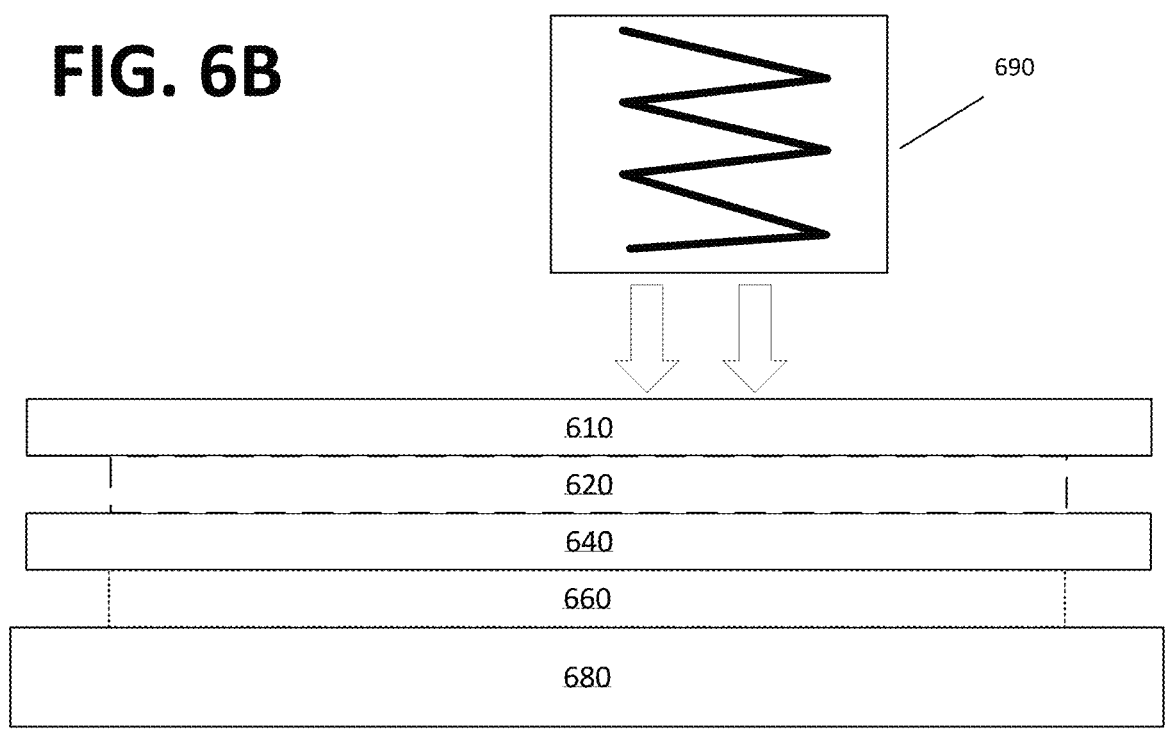
FIG. 6B illustrates a detailed view of the activatable print medium of FIG. 6A, during activation, according to an example the present disclosure.
Figure 6C:
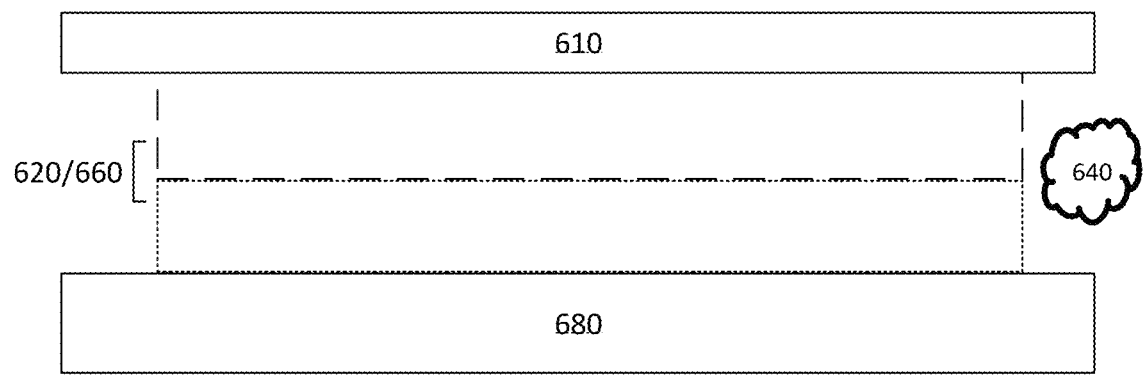
FIG. 6C illustrates a detailed view of the activatable print medium of FIG. 6A, post activation, according to an example of the present disclosure.

FIGS. 6A, 6B and 6C illustrate different embodiments of an activatable print medium 100. As illustrated in FIGS. 6A and 6B, an activatable print medium 600 includes a clear overlaminate film 610, a first reactive component 620, a barrier 640, a second reactive component 660 and a base media substrate 680. The first reactive component 640 and the second reactive component 660 may selected from the above mentioned materials. The barrier 640 is a porous material with an embedded sublimating material that is in a solid state at room temperature but transitions to a gaseous state upon heating above a sublimation material. For example, the sublimating material is one of Naphthalene, Menthol, Cyclododecane, Benzoic acid, Anthracene or a perfluorinated alkane. In some examples, the sublimating temperature may be in a range of about 50° C. to about 300° C., from about 100° C. to about 300° C., from about 150° C. to about 300° C., from about 200° C. to about 300° C., from about 250° C. to about 300° C. The media substrate 680 base layer includes an active layer coated with the second reactive component 660.

Referring to FIG. 6C, after the activatable print medium 600 has been exposed to an activation event 690, the barrier 640 transitions to the activated form where the barrier 640 is configured to allow the first reactive component 620 to interact with the second reactive component 660. (In some examples, this may even result in complete or near-complete removal of the barrier 140.) For example, exposure to an activation event, the application of the at least one of heat and pressure, causes the sublimating material embedded in the pores of the barrier 640 to sublimate, transitioning the barrier 640 from a non-permeable state to a permeable state, bringing the first reactive component 620 and the second reactive component 660 into contact with each other.

The first 620 and second reactive components 660 are configured to interact (a) over a period of time in a manner that is not overly sensitive to expected environmental exposure, (b) in response to a particular environmental stimulus, such as temperature deviations over a threshold, freezing, thawing, oxygen, humidity, or radiation exposure, or (c) over time at a rate dependent on an environmental stimulus, e.g., temperature. In most examples the reaction is irreversible, or at least subject to a strong hysteresis effect, so that the interaction of the first 620 and second reactive components 660 may provide an indication of the historical exposure of the activatable print medium 600 to the environmental stimulus. Specifically, the first reactive component 620 and the second reactive component 660 may be tunable to be temperature sensitive.

For example, referring to FIG. 6D, an optical change occurs at a rate dependent on radiation exposure. As the radiation exposure that the activatable print medium 600 is exposed to increase, the first reactive component 620 and the second reactive component 660 react to cause an optical change. The activatable print medium 600a is in the initial state, immediately prior to activation, where the first reactive component 620 and the second reactive component 660 are restricted from interacting with each other. Upon activation and as the radiation exposure increases, the activatable print medium 600b begins an optical change as the first reactive component 620 and the second reactive component 660 begin to react. Finally, after a radiation exposure threshold has been met, the reaction between the first reactive component 620 and the second reactive component 660 will reach the end state. When the reaction reaches the end state, the optical change has occurred to extent that matches the reference ring 602.

Activatable Layer—Microchannels

Figure 7A:
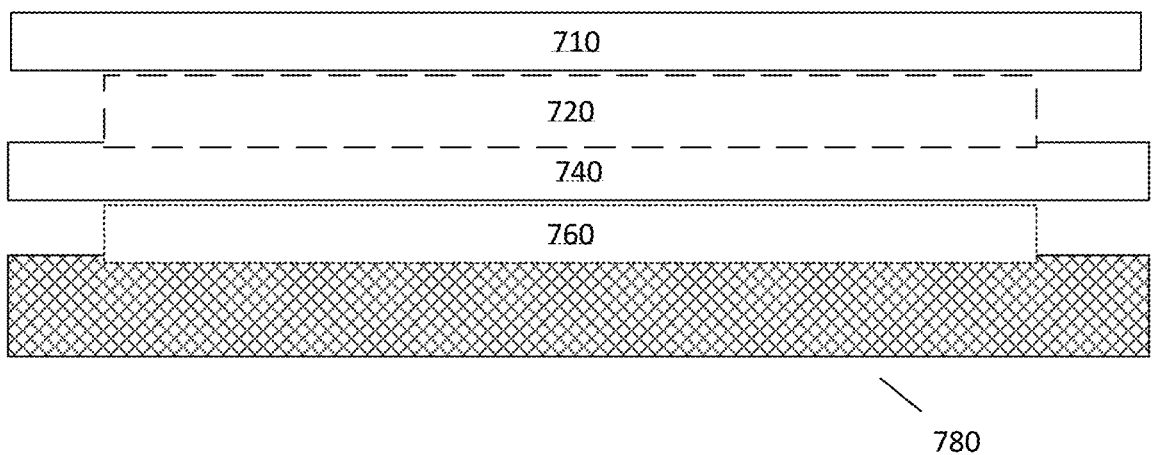
FIG. 7A illustrates a detailed view of an activatable print medium with a microchanneled base layer, prior to activation, according to an example of the present disclosure.
Figure 7B:
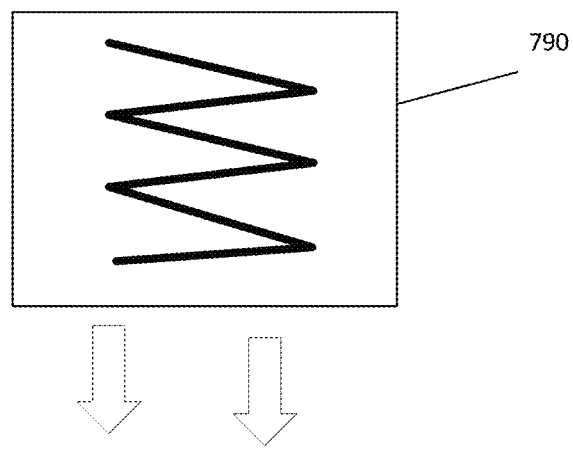
FIG. 7B illustrates a detailed view of the activatable print medium of FIG. 7A, during activation, according to an example the present disclosure.
Figure 7B:
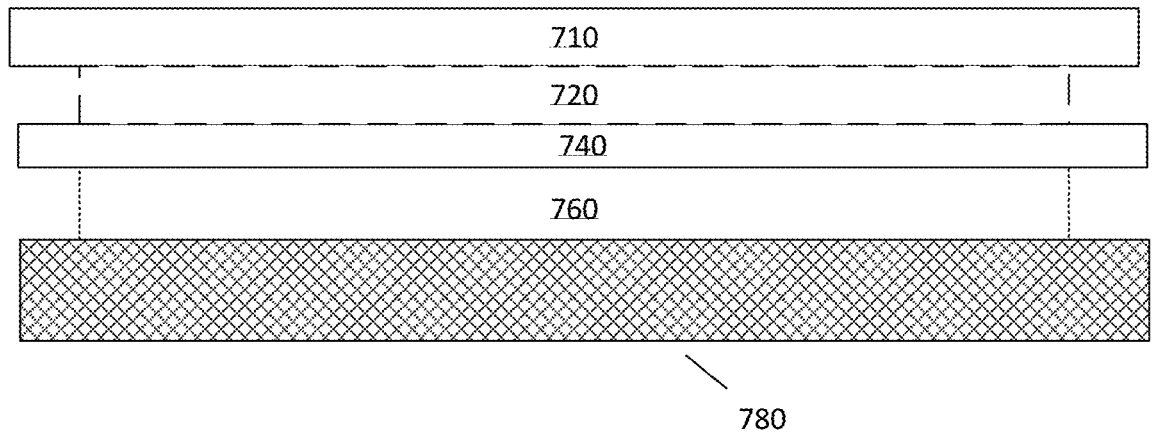
Figure 7C:
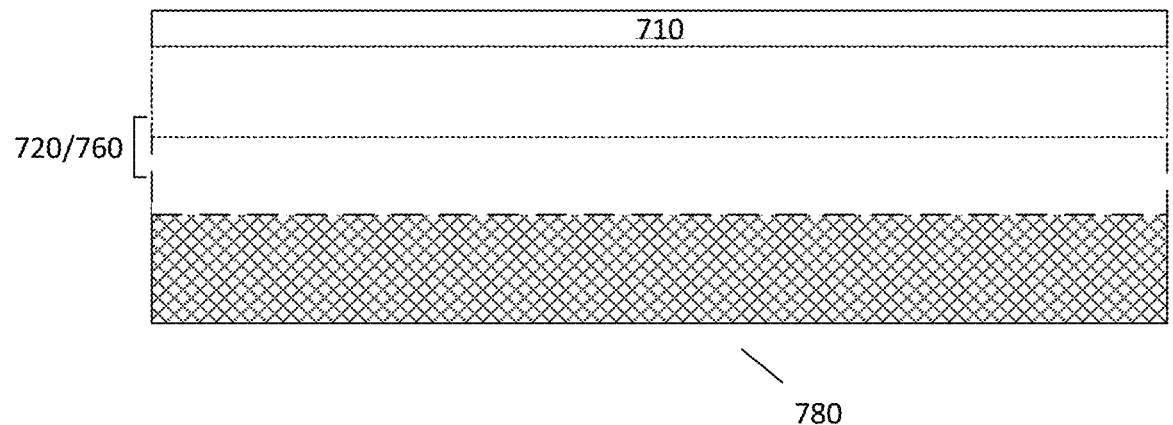
FIG. 7C illustrates a detailed view of the activatable print medium of FIG. 7A, post activation, according to an example of the present disclosure.
Figure 7D:
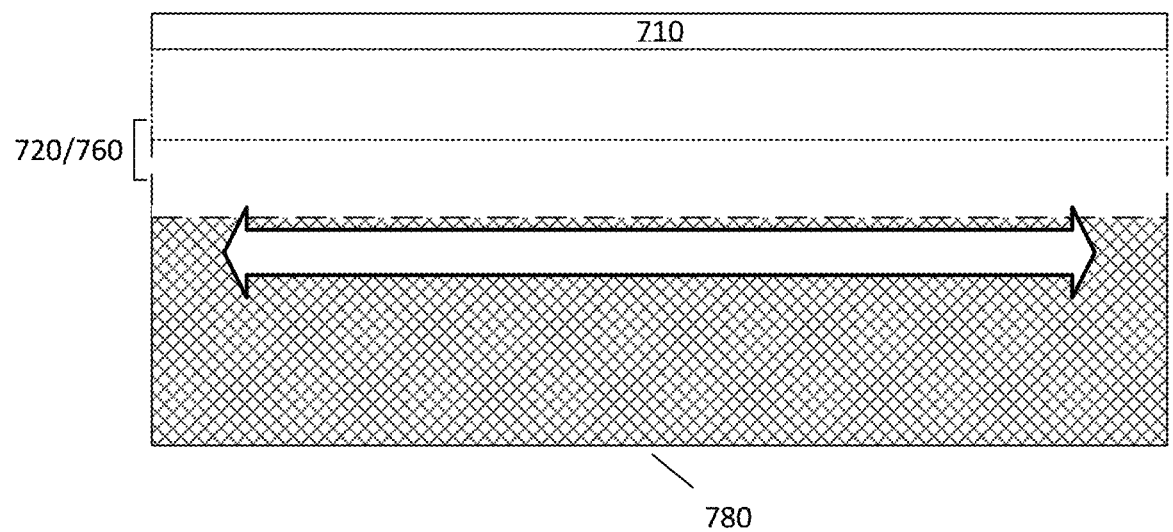
FIG. 7D illustrates a detailed view of the activatable print medium of FIG. 7A, where the second reactive ingredient travels in a planar direction, according to an example of the present disclosure.

FIGS. 7A, 7B and 7C illustrate different embodiments of an activatable print medium 100. As illustrated in FIGS. 7A and 7B, an activatable print medium 700 includes a clear overlaminate film 710, a first reactive component 720, a barrier 740, a second reactive component 760 and a base media substrate 780. The barrier 740 may be selected from one of the above mentioned barrier materials from the "Barrier" section above, provided it is suitable to block the passage of the first reactant. The media substrate 780 is a porous base media substrate having micro-channels. The second reactive component 760 is applied, initially in liquid or gel form, although it may solidify or thicken after it has applied, to the media substrate 780 and occupies the microchannels of the base media substrate 780.

While any two reactants that have an appropriate color-forming reaction, e.g., the reactants described in the "Reactants" section, subpart (3), above. By way of example the first reactant could be Thiocyanate and the second reactive component could include a ferric ion ($Fe^{3+}$) as its main active ingredient. It will be appreciated that the amounts and additives may be tuned so that the color forming reaction occurs at a desired rate for a particular application, e.g., by thinning or thickening the first reactant so that it flows or diffuses more or less readily. Additionally, the media substrate 780 base layer includes an adhesive, release liner.

Referring to FIG. 7C, after the activatable print medium 700 has been exposed to an activation event, the barrier 740 transitions to the activated form where the barrier 740 is configured to allow the first reactive component 720 to interact with the second reactive component 760 (In some examples, this may even result in complete or near-complete removal of the barrier 740.) For example, exposure to an activation event, the application of the at least one of heat and pressure, causes the barrier 740 to melt and at least one of (i) flow away, (ii) sublimate or (iii) become porous, bringing the first reactive component 720 and the second reactive component 760 into potential contact with each other. As the barrier 740 melts, the meltable wax or polymer flows and/or wicks into the microchannels of the media base 780, combining the first 720 and second reactive components 760. In an example, during the activation event, a force is exerted on the meltable wax or polymer barrier 760 and forces the meltable wax or polymer barrier 760 into the microchannels of the media base 780.

The first 720 and second reactive components 760 are configured to interact (a) over a period of time in a manner that is not overly sensitive to expected environmental exposure, (b) in response to a particular environmental stimulus, such as temperature deviations over a threshold, freezing, thawing, oxygen, humidity, or radiation exposure, or (c) over time at a rate dependent on an environmental stimulus, e.g., temperature. In most examples the reaction is irreversible, or at least subject to a strong hysteresis effect, so that the interaction of the first 720 and second reactive components 760 may provide an indication of the historical exposure of the activatable print medium 700 to the environmental stimulus. Specifically, the first reactive component 720 and the second reactive component 760 may be tunable to be temperature sensitive.

In particular the rate of response may be controlled by tuning the rate of the color forming reaction, or by tuning the material so that it diffuses or wicks more slowly through the media base.

For example, in 7D, the second reactive ingredient may be positioned at a different location (in the planar direction) than the area where the barrier is activated. The first reactant will then have to flow along the base media until it reaches the second reactant, triggering the color forming reaction. The rate of flow determined how long this transport of the first reactant will take. By tuning the properties of the porous base media and the viscosity of the first reactant an elapsed time indication can be provided by observing if the color forming reaction has occurred, or alternatively, how far along a scale the color forming reaction has progressed.

Electrical Property Change

Figure 8:
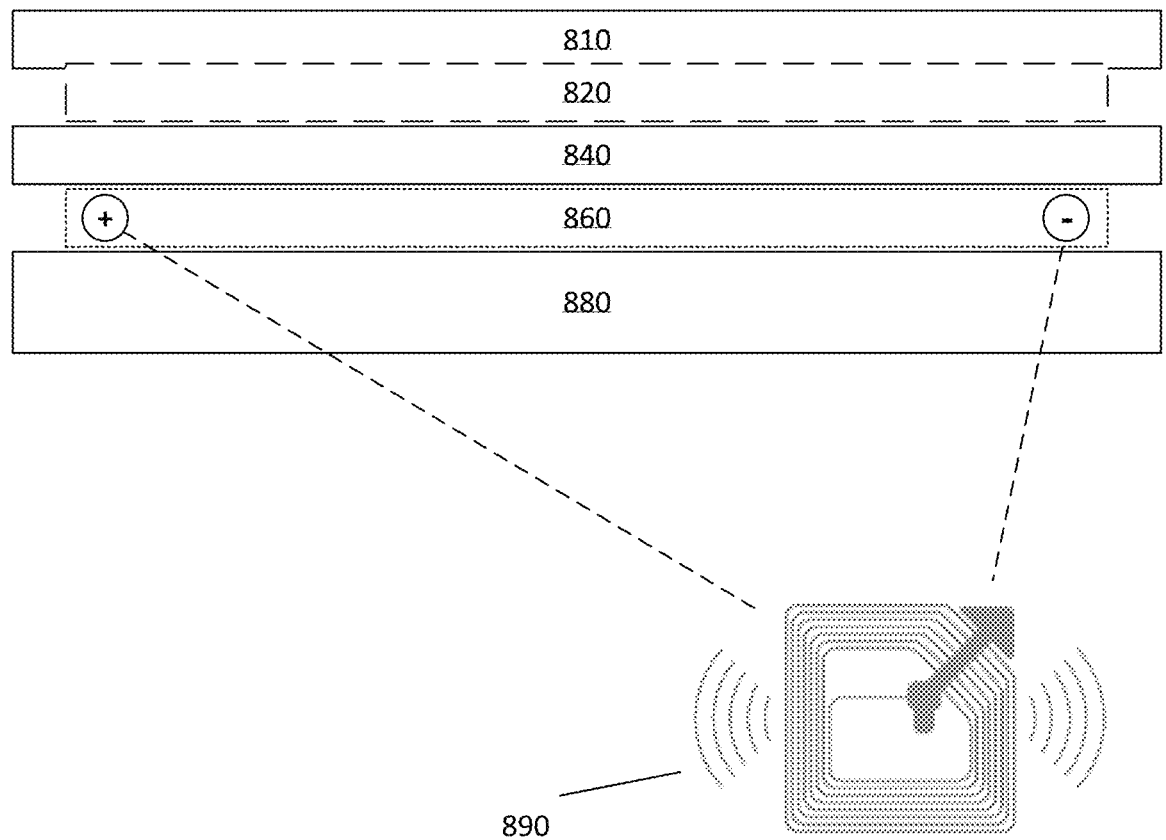
FIG. 8 illustrates a detailed view of an activatable print medium that responds to a predetermined environmental stimulus with a change in electrical state, post activation, according to an example of the present disclosure.

FIG. 8A illustrates an example activatable print medium 100 where the activated indicator, when it changes state, signal electrically, rather than, or in addition to optically. Like the previous, the activatable print medium 800 includes a clear overlaminate film 810, a first reactive component 820, a barrier 840, a second reactive component 860 and a base media substrate 880.

These generally operate in the manner described for the previous indicators, the barrier preventing contact between the two reactants until it has been activated. After the activatable print medium 800 has been exposed to an activation event, the barrier 840 transitions to the activated form where the barrier 840 is configured to allow the first reactive component 820 to interact with the second reactive component 860. (In some examples, this may even result in complete or near-complete removal of the barrier 840.) For example, exposure to an activation event, the application of the at least one of heat and pressure, causes the barrier 840 to melt and at least one of (i) flow away, (ii) sublimate or (iii) become porous, bringing the first reactive component 820 and the second reactive component 260 into contact with each other. As the barrier 840 melts, the first 820 and second reactive components 860 are configured to interact over a period of time.

Distinctively from the earlier described examples, electrical connections may be provided at different points on the base media substrate and/or second reactive component. The first reactive component 820 and the second reactive component 260 combine and produce an electrical change that can be measured (e.g., change in conductivity, impedance and/or resistance). For example, prior to the reaction of the two reactive components, the second reactive component may be nonconductive, or have a high resistivity. After the reaction occurs, the combination may be conductive or have a low resistivity. In this manner, the activatable indicator may be used to close a circuit, e.g, a circuit used in an RFID antenna indicator 890 similar to the ones described in U.S. Pat. No. 10,628,726 to Bhatia.

In some examples, the first 820 and second reactive components 860 may be one of Sodium hydroxide, Keller's reagent (mixture of acids—nitric, hydrochloric, hydrofluoric), phosphoric acid, phosphoric acid/zinc chloride, phosphoric acid/nitric acid, hydrochloric acid, nitric acid, ferric chloride, 2% nital (mixture of nitric acid, ethanol, methanol, or methylated spirits), cupric chloride, ferric chloride, ammonium persulfate, ammonia, 25-50% nitric acid, hydrochloric acid, hydrogen peroxide, silica or hydrofluoric acid.

In an alternative example, rather than being based on a chemical reaction, the first reactant layer may contain conductive particles and or fluid, which may flow into a porous base layer or second reactant layer in sufficient amount to cause the nonconductive layer to become conductive. In an example, the conductive reactants may be one of SCC polymer emulsion/Silver conductive particles, Alkane wax/Nickel conductive particles, Alkane wax or SCC polymer/Graphene nanoparticles, Alkane wax or SCC polymer/Carbon black, Epoxy, silicone rubber, polyimide (PI), polypropylene (PP), low density PE (LDPE), HDPE, aluminum oxide, magnesium oxide, silicon oxide, zinc oxide, boron nitride (BN), Al nitride (AlN), silicon nitride and silicon carbide, graphite, iron, nickel, silicon, silver, tin or zinc.

Figure 9A:
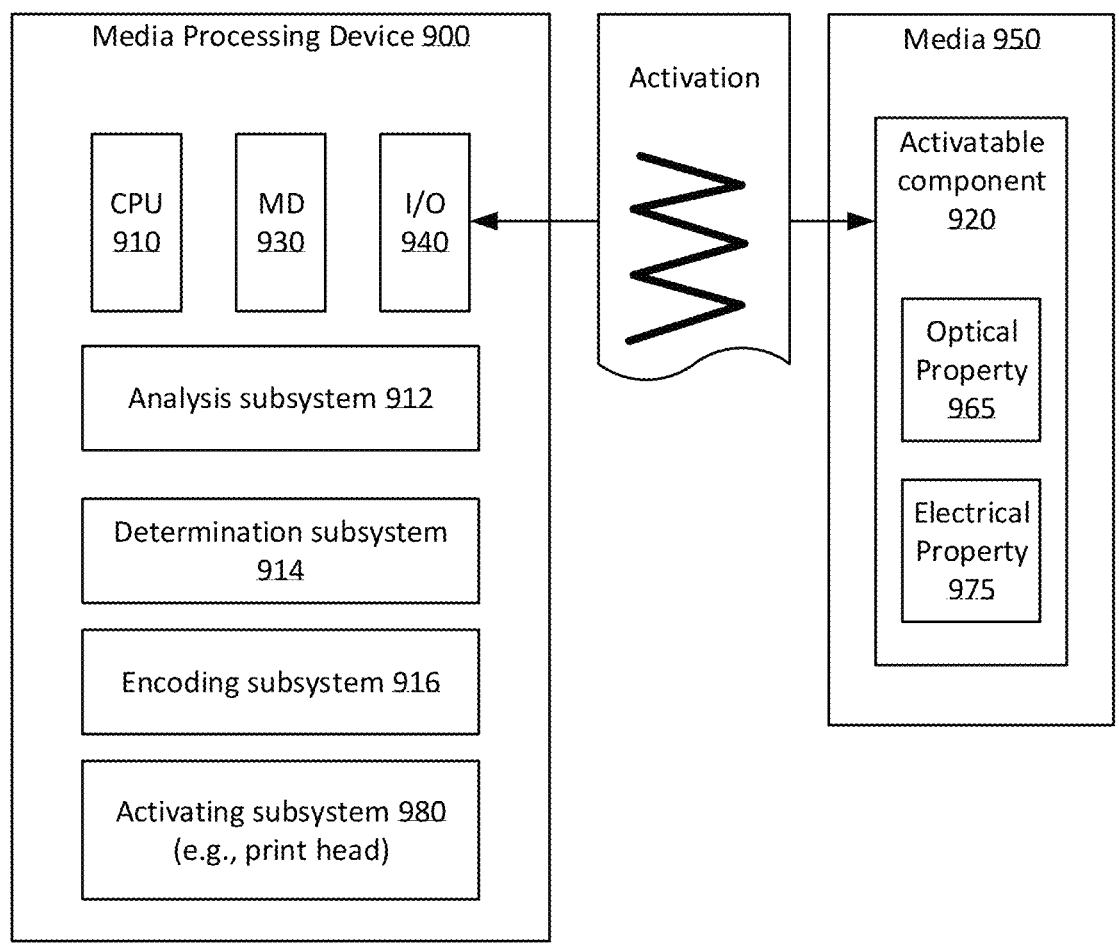
FIG. 9A illustrates a detailed view of an activation device according to an example of the present disclosure.

FIG. 9A illustrates an example of a media processing device 900 configured to be used to activate the activatable print media by producing an activation event. The media processing device may be, e.g., a modification of a conventional thermal printer.

The activation device may also include scanning, digital camera, illumination, or other features. For example, the media processing device 900 may be an industrial printer, such as Zebra's ZT600 Series Industrial Printer, which may have its software or firmware appropriately modified to carry out the operations described in the present disclosure. As illustrated in FIG. 9, a media processing device 900 may include a processor (e.g., CPU 910), memory (e.g., a memory device 930) and an input/output ("I/O") device 940. Furthermore, the media processing device 900 may include an analysis subsystem 912, a determination subsystem 914 and an encoding subsystem 916. These may be provided as software or firmware in the device that is accessible to the processor. One or more of the analysis subsystem 912, determination subsystem 914 and encoding subsystem 316 may be specialized subsystems that may be executed by the CPU 910. Alternatively, one or more of the analysis subsystem 912, a determination subsystem 914 and an encoding subsystem 916 may be their own processing subsystems that reside on separate CPUs, GPUs or other processing equipment. The media processing device may also include various forms of input devices, e.g., a touch screen for user input, and a bar code scanner or digital imager for reading printed information, that are operated under control of the processor.

The system may determine information about a product, e.g., by receiving information read from an existing product label. This may use conventional bar code scanning, digital photography and image analysis, reading RFID information from an RFID on the label or product package, or other conventional approaches to obtaining information from the product, its label, or the package. Information obtained may include the type of product, an identifier for the particular product and/or lot, the type of label, the type of activatable indicators on the label, etc. The analysis subsystem may access a database either locally or over a network for more information about the product, e.g., type of product, how long the product will remain fresh, what temperatures or other environmental conditions the product should not be exposed to. Alternatively, some, or all, of this information may already be encoded in the product label. Or in some cases, this information might be calculated based on other information, e.g., a product life may be determined in part, based on storage temperature.

The determination subsystem determines what information should be added to the existing label and whether and how indicators should be activated. This may be based on the information obtained by the analysis system. Stored data may be accessed to determine what type of indicator should be provided and what information should be printed on the label. The label may contain multiple types of indicators for different conditions, triggered by different temperatures, or with different time durations. For example, there may be multiple types of indicators on a label stock, only some of which are activated, either for different environmental stimuli, or for different thresholds of the same stimuli. An indicator that relies on diffusion of a reactant along scale might be adjustable where along the indicator the activation removes the barrier layer. Elapsed time indicators might be activated based on the shelf life of the particular product being labeled. In some cases, rather than changing how the indicators are activated, the analysis system may instead change how reference markings are added to the label. Based on the shelf life of the product, a different point on a diffusion indicator may be marked as the threshold beyond which the product is no longer acceptable. Or the color reference for a color-changing indicator might be adjusted based on the amount of exposure or time lapse that should be flagged by the indicator.

The encoding subsystem may receive information how the product is to be labeled, and how the indicators are to be activated and convert that into a series of instructions for an activation device, such as a laser or thermal print head. Based on the analysis the determination system the encoding system may determine where and for how long to apply heat and/or pressure on a label containing an activatable indicator. Different levels (e.g., temperatures or intensities) and different durations may be used for activation and thermal printing. Or the device and activatable indicator may be tuned so that the same activation affects both thermal printing areas and activatable indicator areas, in which case they would generally be located on different areas of the label.

The activating subsystem 980 may be configured to activate the activatable component 920 of a media 950 (e.g., a tag or label) comprising the activatable component 920 by applying one of heat or pressure, e.g., as described for any of the example media of the present disclosure. In a simple form, the media processing device may simply receive instructions, e.g., as a download over a network, as to where and how much heat and pressure to apply to the media. This may be accompanied by instructions for normal printing on the media.

Figure 9B:
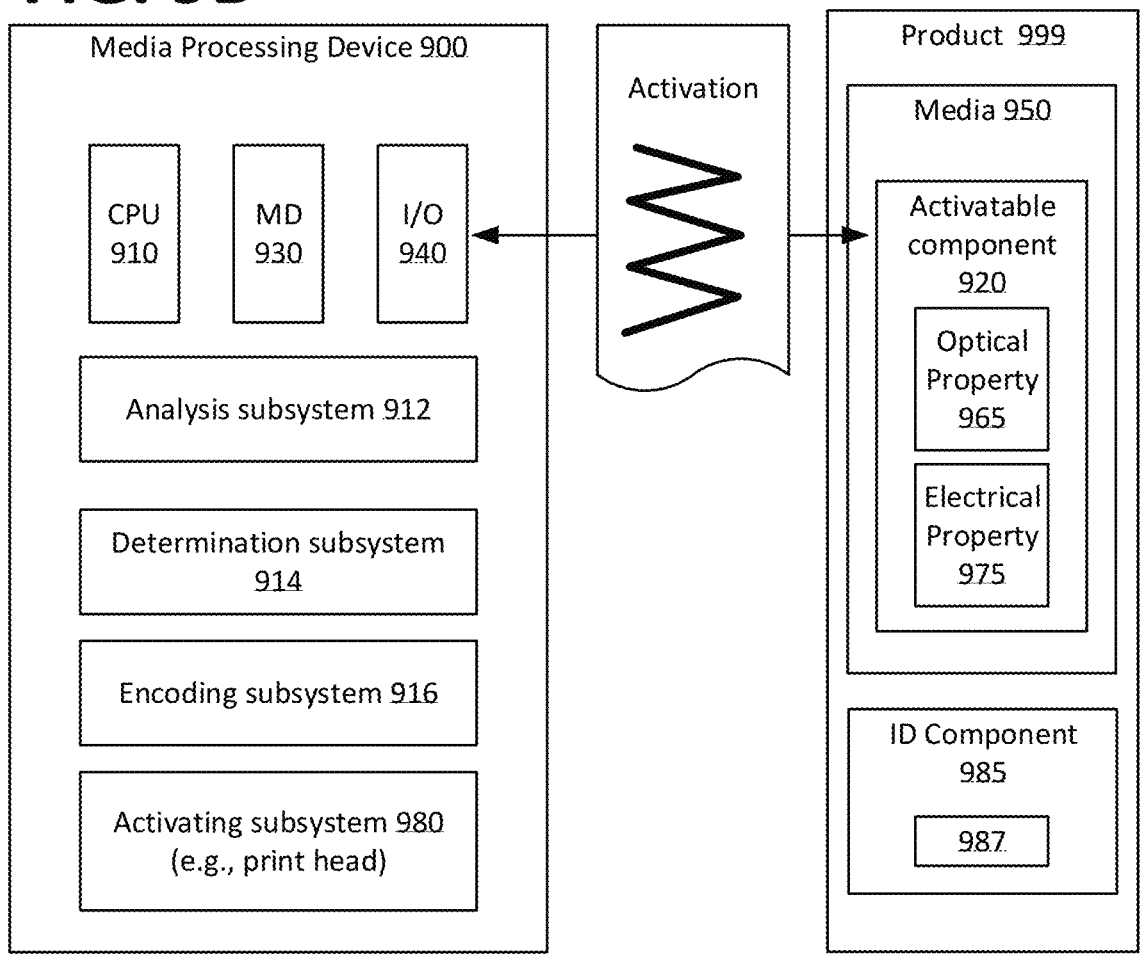
FIG. 9B illustrates a detailed view of a reader according to an example of the present disclosure.
Figure 9B:
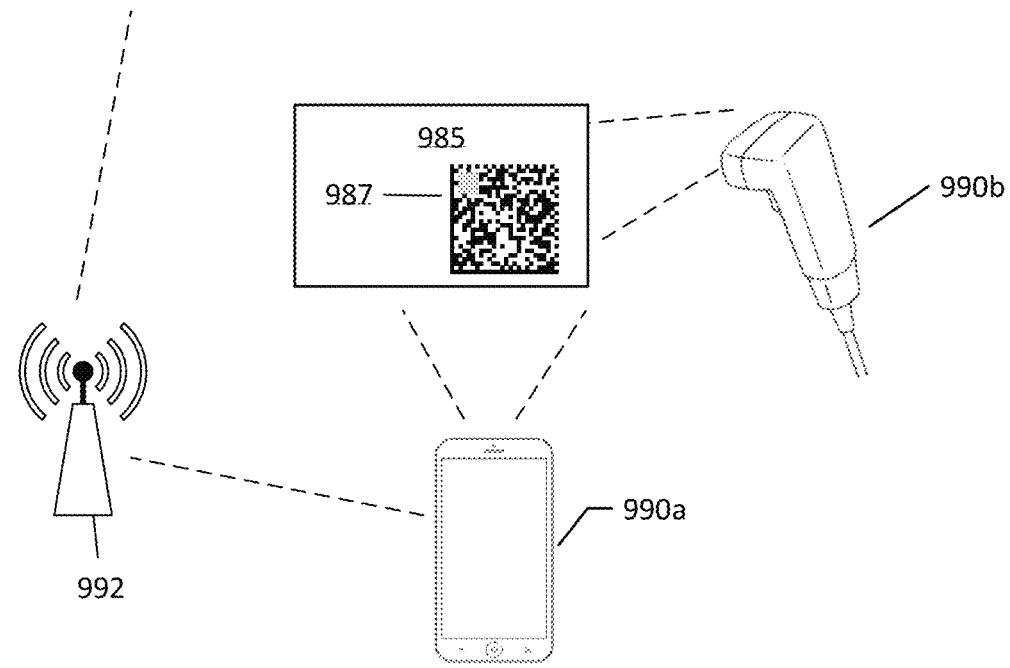

FIG. 9B illustrates an example of a media processing device 900 configured to be used with a reader 990a and 990b (referred to herein generally as reader 990) to scan an ID Component 985 (e.g. label), containing ID data 987. The reader 990 provides instructions to the media processing device 990 to activate the activatable print media by producing an activation event. The media processing device may be, e.g., a modification of a conventional thermal printer.

FIG. 9B illustrates example product 999 that includes a media 950 fixed to the product 999 including an ID component 985 and the associated ID data 987. The reader 990 may also be configured to read calibration data associated with the ID component 985. The reader 990 may be a dedicated reader (e.g., reader 990b) or an apparatus configured to read an ID component 990b (e.g., reader 990b) such as a mobile device, a personal digital assistant or PDA, a smartphone, a laptop, a tablet computer, or a desktop computer, as well as any other user devices. In a more specific example, reader 990 may be a Scanner provided by Zebra, such as any of the Zebra scanners or handheld computers (e.g., Zebra's EC50 and EC55 Enterprise Mobile Computers, MC2200 and MC2700, TC21 and TC26, etc.).

The reader 990 may be adapted to read ID components 985 with various indicia, such as machine-readable symbols (e.g., 1D, 2D barcodes and/or data matrixes). Additionally, the reader 990 may also transmit, receive, or exchange data with other network devices via a communication network 992. A network device may be a computer, a different reader 990, or any other device accessible via a communication network. Certain data may be stored in the reader 990, which may also be stored on a server within the network, either temporarily or permanently, for example in memory or a media processing device 900 (e.g., memory device 930). The network connection may be any type of network connection, such as a cellular or wireless connection, an Ethernet connection, digital subscriber line, telephone line, coaxial cable, etc. Access to a reader 990 or image data obtained by the reader 990 may be controlled by appropriate security software or security measures. An individual users' access may be defined by reader 990 and limited to certain data and/or actions.

For example, when a product 999 is received, the reader 990 is used to scan an ID component 985 and the associated ID data 987. The reader 990 communicates with the media processing device 900 via a communication network 992. Responsive to the specific ID data 987 received, the media processing device 900 prints a specific media 950 that corresponds to the received ID data 987 based on instructions either stored in memory 930 of the media processing device 900 or in a data base. The media processing device 900 may access the data base via a communication network 992. Upon receiving instructions, the media processing device 900 prints and activates the product specific media.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention claimed is:

1. An activatable print medium comprising:
a first reactive component;
a second reactive component, the first and second reactive components configured to react to initiate a state change of the activatable print medium when exposed to each other; and
a barrier initially in an unactivated form and configured to transition to an activated form when activated by an application of an activation heat, the barrier comprising a polymer having a glass transition temperature, and the activation heat heats the polymer above the glass transition temperature, causing the barrier to transition from a nonpermeable state to a permeable state, wherein
in the unactivated form, the barrier is in the nonpermeable state and is configured to separate the first reactive component and the second reactive component, preventing their interaction,
in the activated form, the barrier is in a permeable state and configured to allow the first reactive component to interact with the second reactive component,
wherein, after the barrier is activated, but not before, the activatable print medium is configured so that it has a property selected from the list consisting of:
(a) the first and second reactive components are configured to interact in response to a predetermined environmental stimulus which occurs after the barrier was activated, thereby providing an indication of an historical exposure of the activatable print medium to the environmental stimulus that occurs after the barrier was activated, and
(b) the first and second reactive components are configured to interact over time at a rate dependent on the environmental stimulus which occurs after the barrier was activated, thereby providing an indication of a cumulative historical exposure of the activatable print medium to the environmental stimulus that occurs after the barrier was activated.

2. The activatable print medium of claim 1, wherein the activation heat is above a temperature of 100° C., and wherein the predetermined environmental stimulus is a temperature exposure above a predetermined threshold, the predetermined threshold in a range from 0° C. to 50° C.

3. The activatable print medium of claim 1, wherein the property is (b), and the first and second reactive components are configured to react to initiate a continuous state change of the activatable print medium the continuous state change having a rate depending on the environmental stimulus.

4. The activatable print medium of claim 1, wherein the property is (b), and wherein the environmental stimulus is one of, temperature, heat, moisture, humidity, oxygen exposure, light exposure, ionizing radiation, and UV radiation.

5. The activatable print medium of claim 1, wherein the state change is a change in an electrical property of the activatable print medium.

6. The activatable print medium of claim 1, wherein a melting point of the barrier is in a range from 50° C. to 300° C.

7. The activatable print medium of claim 1, wherein
the first reactive component is a base,
and
the second reactive component is an acid.

8. The activatable print medium of claim 1, wherein the polymer is Polysulfone.

9. The activatable print medium of claim 1, wherein the glass transition temperature is at least 190° C.

10. The activatable print medium of claim 1, wherein the state change is an optical property change of the activatable print medium, wherein the optical property is one of reflectance, transparency, saturation, color, apparent color, color density, optical density, or a color hue.

11. The activatable print medium of claim 10, wherein the state change is a change in apparent color visible to a naked human eye.

12. The activatable print medium of claim 1, further comprising a base media substrate, wherein the first and second reactive components are supported by the base media substrate.

13. The activatable print medium of claim 12, wherein the base media substrate further comprises at least one of (i) a metallic layer, (ii) aluminum, (ii) an absorbent substrate, (iii) a paper substrate, (iv) a cellulose paper, and (v) a polymer film substrate.

14. The activatable print medium of claim 1, wherein
the first reactive component is an etchant,
the barrier further resists the etchant in the unactivated state but is permeable to the etchant in the activated state, and
the second reactive component is an etchable coating protected from the etchant by the barrier when the barrier is in the unactivated state.

15. The activatable print medium of claim 14, wherein the etchable coating is a metallic coating.

16. The activatable print medium of claim 14, wherein the state change is a color change, and wherein the color change occurs gradually over time.

17. The activatable print medium of claim 1, wherein
the first reactive component is thiocyanate,
and
the second reactive component is a ferric ion ($Fe3+$).

18. The activatable print medium of claim 17, wherein the barrier includes a polymer gel, and the polymer gel has a melting point above 100° C.

19. The activatable print medium of claim 17, wherein the first reactive component is at least one of (i) incorporated into the barrier and (ii) applied as an over-layer or over-coating on the barrier.

20. The activatable print medium of claim 17, wherein the state change is a color change, and wherein the color change occurs gradually over time.

21. An activatable print medium comprising:
a first reactive component;
a second reactive component, the first and second reactive components configured to react to initiate a state change of the activatable print medium when exposed to each other; and
a barrier initially in an unactivated form and configured to transition to an activated form when activated by an application of at least one of an activation heat and an activation pressure, wherein
in the unactivated form, the barrier is configured to separate the first reactive component and the second reactive component, preventing their interaction,
in the activated form, the barrier is configured to allow the first reactive component to interact with the second reactive component,
wherein, after the barrier is activated, but not before, the activatable print medium is configured so that it has a property selected from the list consisting of:
(a) the first and second reactive components are configured to interact in response to a predetermined environmental stimulus which occurs after the barrier was activated, thereby providing an indication of an historical exposure of the activatable print medium to the environmental stimulus that occurs after the barrier was activated, and
(b) the first and second reactive components are configured to interact over time at a rate dependent on the environmental stimulus which occurs after the barrier was activated, thereby providing an indication of a cumulative historical exposure of the activatable print medium to the environmental stimulus that occurs after the barrier was activated; and
wherein the second reactive component is applied to a porous base media substrate having micro-channels, and wherein the second reactive component occupies the micro-channels of the base media substrate.

22. An activatable print medium comprising:
a first reactive component;
a second reactive component, the first and second reactive components configured to react to initiate a state change of the activatable print medium when exposed to each other; and
a barrier initially in an unactivated form and configured to transition to an activated form when activated by an application of at least one of an activation heat and an activation pressure, wherein
in the unactivated form, the barrier is configured to separate the first reactive component and the second reactive component, preventing their interaction,
in the activated form, the barrier is configured to allow the first reactive component to interact with the second reactive component,
wherein, after the barrier is activated, but not before, the activatable print medium is configured so that it has a property selected from the list consisting of:
(c) the first and second reactive components are configured to interact in response to a predetermined environmental stimulus which occurs after the barrier was activated, thereby providing an indication of an historical exposure of the activatable print medium to the environmental stimulus that occurs after the barrier was activated, and
(d) the first and second reactive components are configured to interact over time at a rate dependent on the environmental stimulus which occurs after the barrier was activated, thereby providing an indication of a cumulative historical exposure of the activatable print medium to the environmental stimulus that occurs after the barrier was activated; and
wherein
the first reactive component is a meltable material formulated as one of a dispersion or an emulsion having a particle size,
the barrier is a porous material with a pore size smaller than the particle size, and
the second reactive component is an absorbent substrate impregnated with a reactive dye.

23. The activatable print medium of claim 22, wherein
the meltable material is Polystyrene,
the porous material is one of carbon fiber, Teslin synthetic paper, polyethylene ("PE"), polypropylene ("PP"), and polytetrafluoroethylene ("PTFE"), and
the absorbent substrate is paper.

24. The activatable print medium of claim 22, wherein the reactive dye is configured to change color in response to an interaction with the first reactive component.

25. The activatable print medium of claim 22, wherein first reactive component is formulated as one of a dispersion and an emulsion having a particle size smaller than a pore size of the absorbent substrate.

26. The activatable print medium of claim 25, wherein responsive to an application heat from a thermal print head, the first reactive component is configured to pass through the barrier thereby being absorbed into the absorbent substrate.

27. A method for activating an activatable indicator with a media processing device having a thermal print head, the method comprising:
receiving an activatable print medium, the activatable print medium including:
a first reactive component,
a second reactive component, the first and second reactive components configured to react to initiate a state change of the activatable print medium when exposed to each other, and
a barrier comprising a polymer having a glass transition temperature, the barrier initially in an unactivated form and configured to transition to an activated form when activated by an application of an activation heat which heats the polymer above the glass transition temperature, causing the barrier to transition from a nonpermeable state to a permeable state wherein
in the unactivated form, the barrier is in the nonpermeable state and is configured to separate the first reactive component and the second reactive component, preventing their interaction,
in the activated form, the barrier is in the permeable state and is configured to allow the first reactive component to interact with the second reactive component,
wherein, after the barrier is activated, but not before, the activatable print medium is configured so that it has at least one property selected from the group consisting of:
(a) the first and second reactive components are configured to interact in response to a predetermined environmental stimulus which occurs after the barrier was activated and thereby providing an indication of an historical exposure of the activatable print medium to the environmental stimulus after the barrier is activated, and
(b) the first and second reactive components are configured to interact over time and to initiate the state change at a rate dependent on a predetermined environmental stimulus which occurs after the barrier was activated, thereby providing an indication of a cumulative historical exposure of the activatable print medium to the environmental stimulus after the barrier is activated; and
applying heat to the activatable print medium using the thermal print head of the media processing device, thereby transitioning the barrier from the unactivated form to the activated form and thereby allowing the first reactive component to interact with the second reactive component in response to the environmental stimulus that occurs after barrier was activated.

28. The method of claim 27, wherein the applying at least one of heat and pressure includes applying heat above a temperature of 100° C., and wherein the environmental stimulus is a temperature exposure in a range from 0° C. to 50° C.

29. The method of claim 27, initiating a continuous state change of the activatable print medium by causing the first and second components to react.

30. The method of claim 27, further comprising monitoring the state change of the activatable print medium.

31. The method of claim 27, wherein the environmental stimulus is one of temperature, heat, cumulative heat exposure, moisture, humidity, oxygen exposure, light exposure, ionizing radiation, and UV radiation.

32. The method of claim 27, initiating a time delayed state change with the first reactive component of the activatable print medium.

33. The method of claim 27, wherein the activatable print medium further includes a protective component overlaying the first reactive component, wherein the protective component protects the first reactive component from the thermal print head.

34. The method of claim 27, further comprising, melting the barrier by heating the barrier to a temperature in a range from 50° C. to 300° C.

35. The method of claim 27, wherein the state change is an optical property change of the activatable print medium selected from the group consisting of reflectance, transparency, saturation, color, apparent color, color density, optical density, or a color hue.

36. The method of claim 35, wherein the state change is a change in apparent color visible to a naked human eye.

37. An activatable print medium, comprising:
a first reactive component;
a second reactive component, the first and second reactive components configured to react to initiate a state change of the activatable print medium when exposed to each other; and
a barrier initially in an unactivated form and configured to transition to an activated form when activated by an application of an activation heat, wherein
in the unactivated form, the barrier is configured to separate the first reactive component and the second reactive component, preventing their interaction,
in the activated form, the barrier is configured to allow the first reactive component to interact with the second reactive component,
wherein, after the barrier is activated, but not before, the activatable print medium is configured so that it has a property selected from the list consisting of:
(a) the first and second reactive components are configured to interact in response to a predetermined environmental stimulus which occurs after the barrier was activated, thereby providing an indication of an historical exposure of the activatable print medium to the environmental stimulus that occurs after the barrier was activated, and
(b) the first and second reactive components are configured to interact over time at a rate dependent on the environmental stimulus which occurs after the barrier was activated, thereby providing an indication of a cumulative historical exposure of the activatable print medium to the environmental stimulus that occurs after the barrier was activated; and
wherein the application of heat causes a component of the barrier to sublime, thereby bringing the first reactive component and the second reactive component into contact with each other.

38. The activatable print medium of claim 37, wherein
the first reactive component comprises a basic reactant,
the barrier is a porous material with a blocking material embedded in the porous material, the blocking material being a sublimating material, and
the second reactive component comprises an acidic reactant.

39. The activatable print medium of claim 38, wherein at least one of the first or the second reactive component is applied to a media substrate.

40. The activatable print medium of claim 38, wherein the barrier is adapted to transition from the unactivated form to the activated form responsive to an application of heat from a thermal print head, and wherein the application of heat causes the blocking material to sublimate thereby allowing the first reactive component to interact with the second reactive component.

41. The activatable print medium of claim 38, wherein the state change is a color change, and wherein the color change occurs gradually over time.

42. The activatable print medium of claim 38, wherein the sublimating material is configured to transition from a solid state to a gaseous state above a sublimation temperature.

43. The activatable print medium of claim 42, wherein the sublimating material is selected from the group consisting of Naphthalene, Menthol, Cyclododecane, Benzoic acid, Anthracene, and a perfluorinated alkane.

* * * * *